US011290147B2

(12) United States Patent
Liu et al.

(10) Patent No.: US 11,290,147 B2
(45) Date of Patent: Mar. 29, 2022

(54) FREQUENCY HOPPING WITH SLOT BUNDLING

(71) Applicant: QUALCOMM Incorporated, San Diego, CA (US)

(72) Inventors: Le Liu, Fremont, CA (US); Alberto Rico Alvarino, San Diego, CA (US); Peter Pui Lok Ang, San Diego, CA (US); Huilin Xu, San Diego, CA (US); Hung Dinh Ly, San Diego, CA (US); Renqiu Wang, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 57 days.

(21) Appl. No.: 16/937,364

(22) Filed: Jul. 23, 2020

(65) Prior Publication Data

US 2021/0058111 A1 Feb. 25, 2021

Related U.S. Application Data

(60) Provisional application No. 62/891,218, filed on Aug. 23, 2019.

(51) Int. Cl.
*H04B 1/7143* (2011.01)
*H04L 1/18* (2006.01)
(Continued)

(52) U.S. Cl.
CPC ........... *H04B 1/7143* (2013.01); *H04L 1/189* (2013.01); *H04L 5/0092* (2013.01); *H04W 24/08* (2013.01);
(Continued)

(58) Field of Classification Search
CPC ......... H04W 74/0833; H04W 72/0446; H04W 24/08; H04W 72/0453; H04B 1/7143;
(Continued)

(56) References Cited

U.S. PATENT DOCUMENTS

| 2018/0248674 A1 | 8/2018 | Bhattad et al. |
| 2021/0099259 A1* | 4/2021 | Salem .................. H04L 1/1854 |

(Continued)

FOREIGN PATENT DOCUMENTS

WO WO-2016154877 A1 10/2016

OTHER PUBLICATIONS

International Search Report and Written Opinion—PCT/US2020/043538—ISA/EPO—dated Oct. 27, 2020 (194527WO).

*Primary Examiner* — Brian D Nguyen
(74) *Attorney, Agent, or Firm* — Holland & Hart LLP

(57) ABSTRACT

Methods, systems, and devices for wireless communications are described. A user equipment (UE) may transmit uplink transmissions according to a frequency hopping pattern. The UE may identify that a first set of uplink transmissions are to be transmitted to a base station by a first set of resources (e.g., a first set of slots, a first set of frequency resources) as indicated by the frequency hopping pattern. The UE may further identify, based on the frequency hopping pattern, that a second set of uplink transmissions are to be transmitted to the base station by a second set of resources (e.g., a second set of slots, a second set of frequency resources). The first set of slots and the second set of slots may each include more than one slot. Additionally, the first and second set of resources may be within a same bandwidth part or in different bandwidth parts.

30 Claims, 24 Drawing Sheets

(51) Int. Cl.
*H04L 5/00* (2006.01)
*H04W 24/08* (2009.01)
*H04W 72/04* (2009.01)
*H04W 74/08* (2009.01)

(52) U.S. Cl.
CPC ... *H04W 72/0446* (2013.01); *H04W 72/0453* (2013.01); *H04W 74/0833* (2013.01)

(58) Field of Classification Search
CPC ..... H04L 5/001; H04L 5/0012; H04L 1/1893; H04L 5/0092; H04L 1/189; H04L 5/0023; H04L 5/0007
See application file for complete search history.

(56) References Cited

U.S. PATENT DOCUMENTS

| | | | |
|---|---|---|---|
| 2021/0105804 A1* | 4/2021 | Bagheri | H04W 72/085 |
| 2021/0144716 A1* | 5/2021 | Choi | H04W 72/042 |
| 2021/0298029 A1* | 9/2021 | Liu | H04L 5/0094 |
| 2021/0314976 A1* | 10/2021 | Zhang | H04W 72/1263 |
| 2021/0337528 A1* | 10/2021 | Lindoff | H04L 5/0044 |

\* cited by examiner

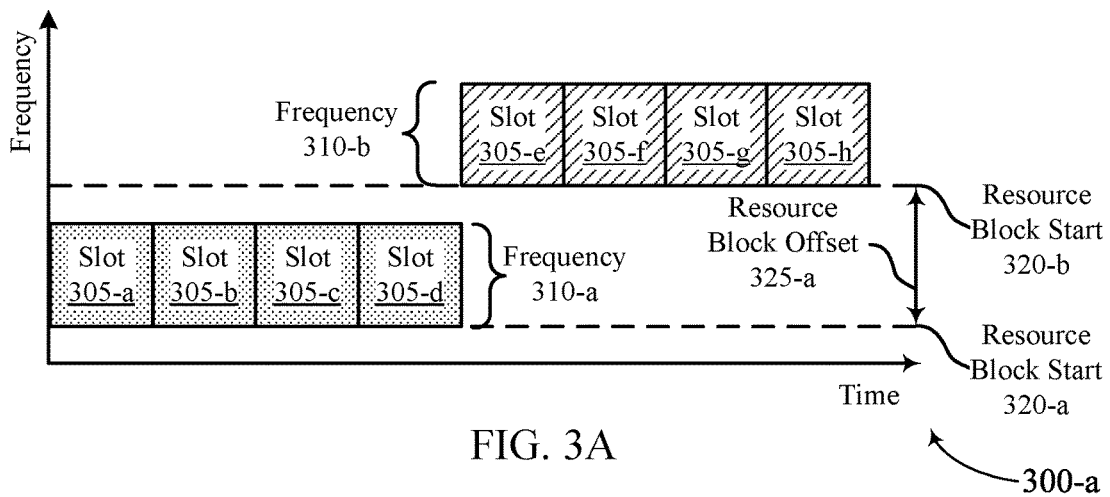
FIG. 3A
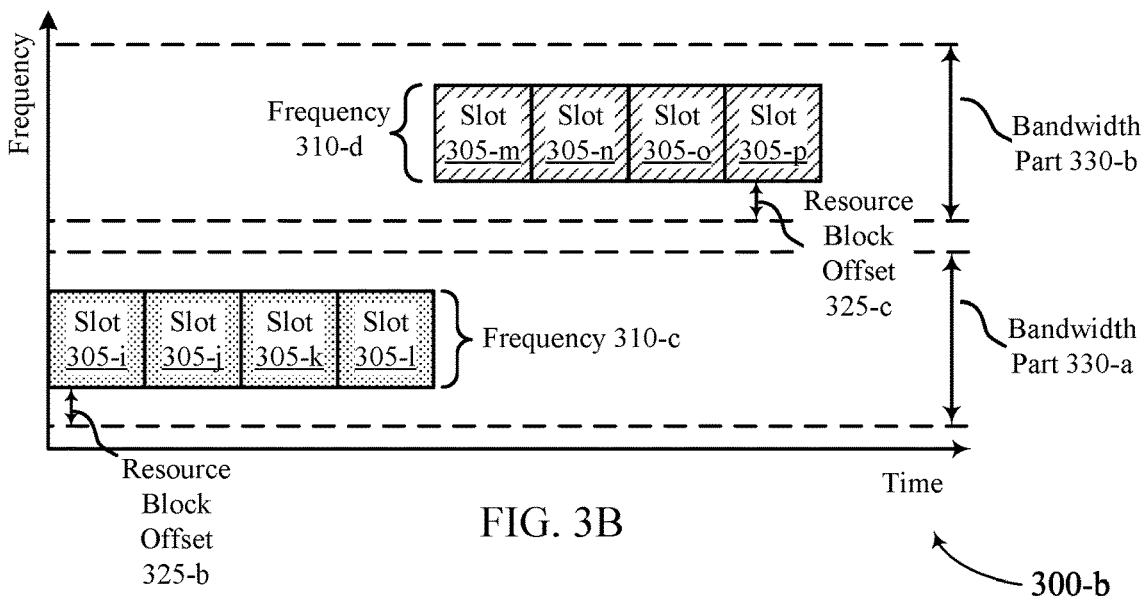
FIG. 3B
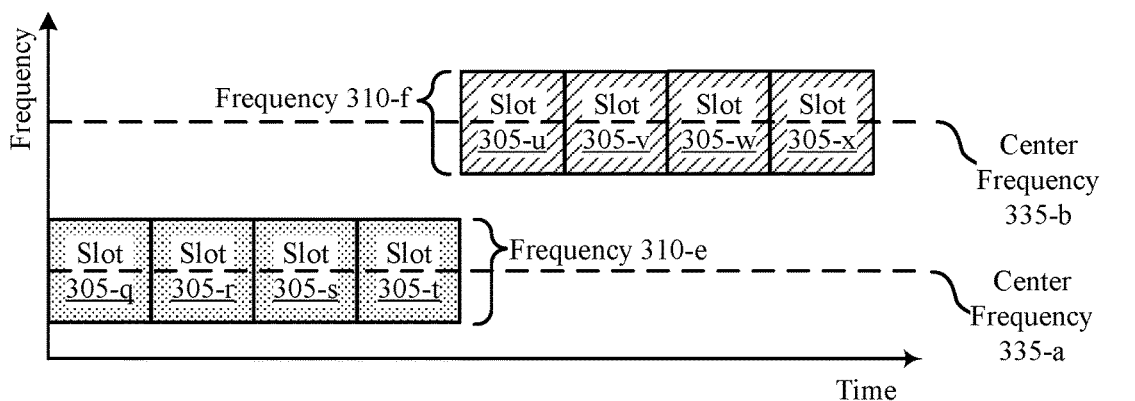
FIG. 3C
 Transmission    Retransmission

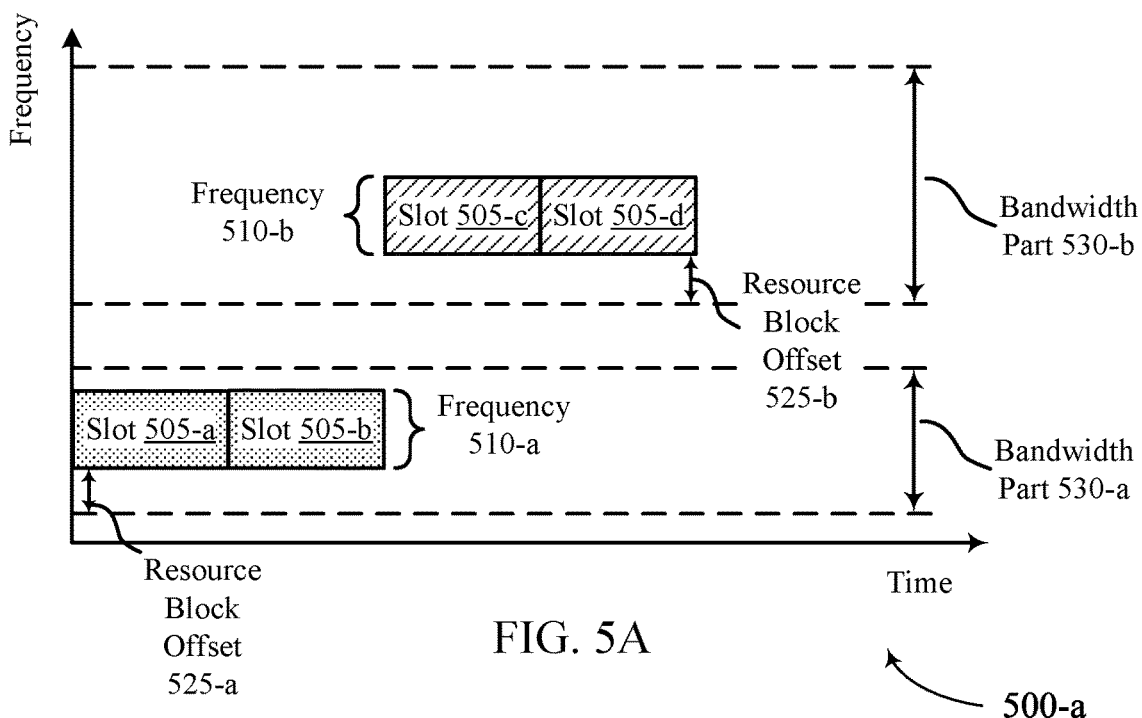
FIG. 5A
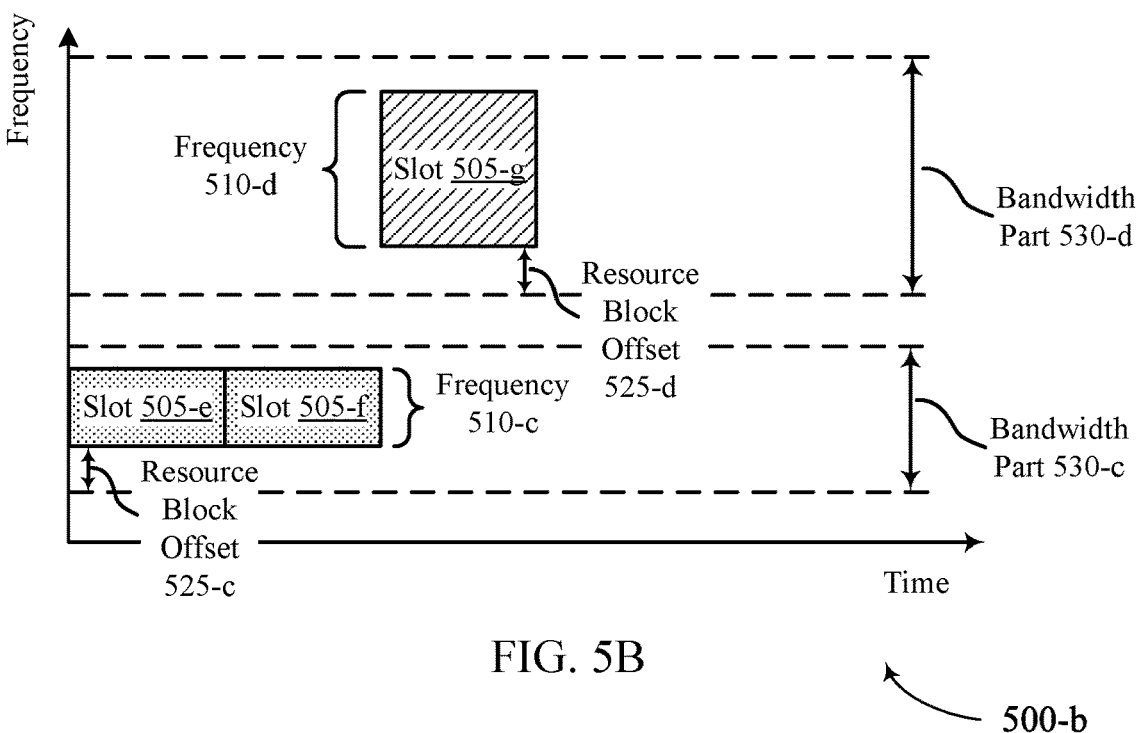
FIG. 5B
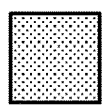 Transmission
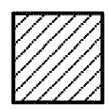 Retransmission

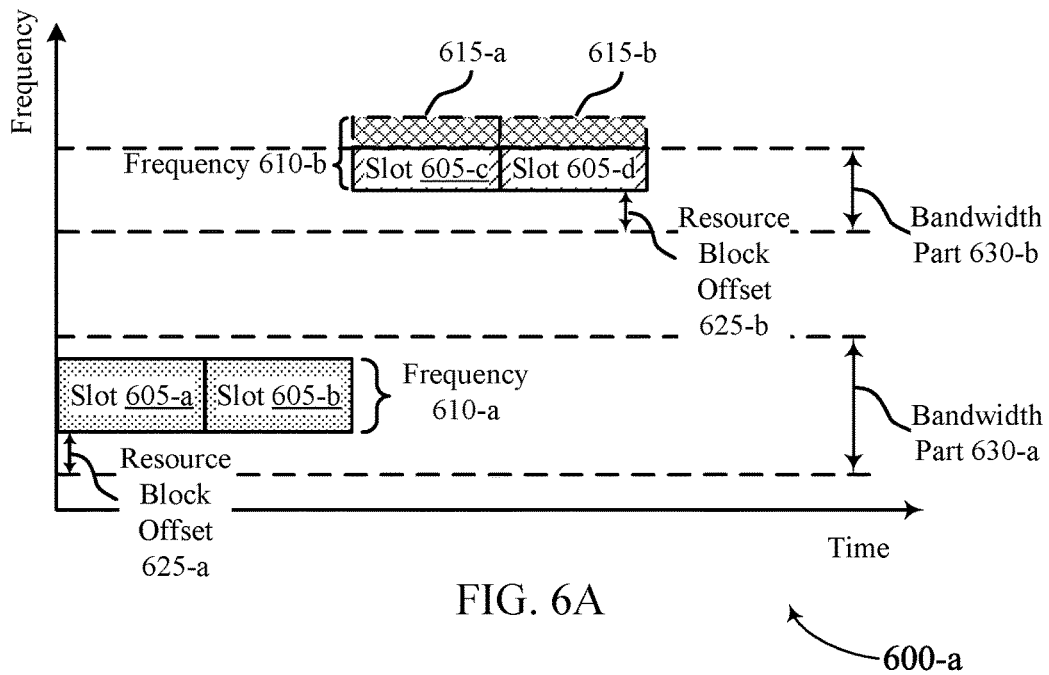
FIG. 6A
600-a
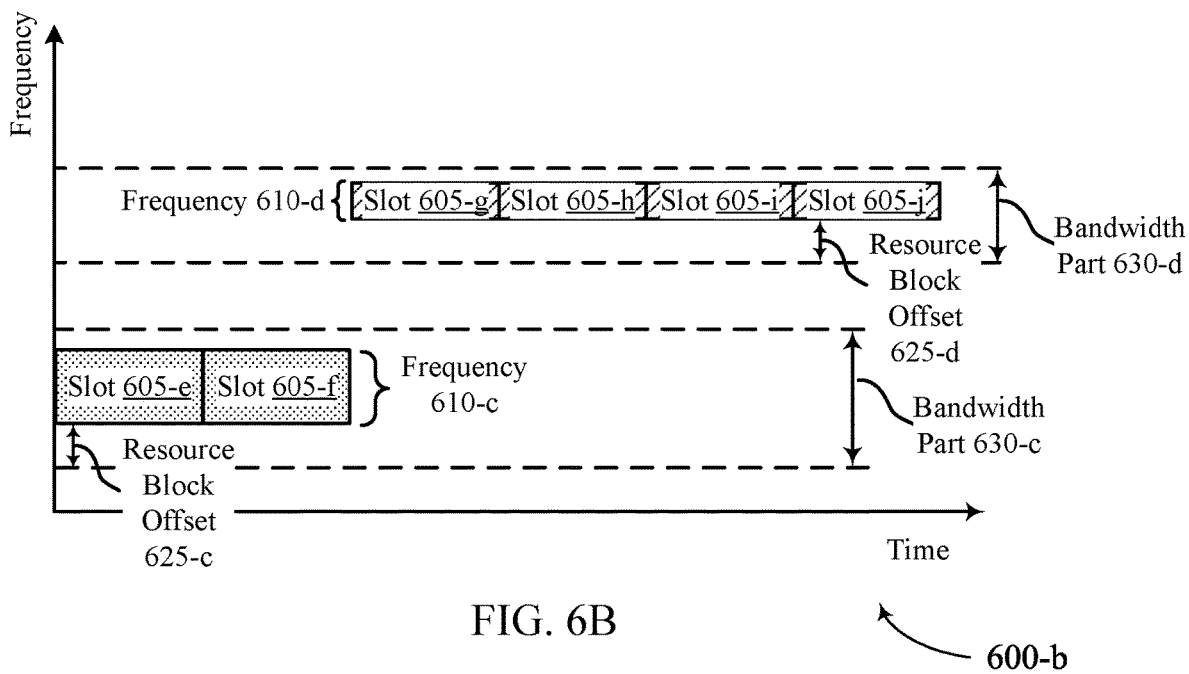
FIG. 6B
600-b
 Transmission   Retransmission   Dropped Transmission

FREQUENCY HOPPING WITH SLOT BUNDLING

CROSS REFERENCE

The present application for patent claims the benefit of U.S. Provisional Patent Application No. 62/891,218 by LIU et al., entitled "FREQUENCY HOPPING WITH SLOT BUNDLING," filed Aug. 23, 2019, assigned to the assignee hereof, and expressly incorporated by reference herein.

FIELD OF TECHNOLOGY

The following relates generally to wireless communications and to frequency hopping with slot bundling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support frequency hopping with slot bundling. Generally, the described techniques provide for a user equipment (UE) to transmit uplink communications to a base station according to a frequency hopping pattern. The frequency hopping pattern may define a first set of frequency resources for a first uplink transmission that spans more than one slot. The frequency hopping pattern may further define a second set of frequency resources (e.g., different than the first set of frequency resources) for a next uplink transmission that may also span more than one slot. In some cases, the first and second sets of frequency resources may be in a same bandwidth part. Alternatively, the first and second sets of frequency resources may be in different bandwidth parts. The UE and the base station may identify the frequency hopping pattern and communicate accordingly. In some cases, a UE may perform a retuning operation to determine relevant phase information prior to performing an uplink transmission on the second set of frequency resources. In some cases, the frequency hopping with slot bundling may advantageously be used by bandwidth-limited UEs, such as a Light UE.

A method of wireless communications at a UE is described. The method may include identifying that one or more uplink transmissions are to be transmitted by the UE during a first set of slots and within a first set of frequency resources, identifying that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots, identifying a set of symbols at an end of a last slot of the first set of frequency resources for performing a retuning operation prior to a retransmission of the one or more uplink transmissions, and transmitting the one or more uplink transmissions in accordance with the frequency hopping pattern and the retuning operation.

An apparatus for wireless communications at a UE is described. The apparatus may include a processor, memory coupled with the processor, and instructions stored in the memory. The instructions may be executable by the processor to cause the apparatus to identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots, identify a set of symbols at an end of a last slot of the first set of frequency resources for performing a retuning operation prior to a retransmission of the one or more uplink transmissions, and transmit the one or more uplink transmissions in accordance with the frequency hopping pattern and the retuning operation.

Another apparatus for wireless communications at a UE is described. The apparatus may include means for identifying that one or more uplink transmissions are to be transmitted by the UE during a first set of slots and within a first set of frequency resources, identifying that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots, identifying a set of symbols at an end of a last slot of the first set of frequency resources for performing a retuning operation prior to a retransmission of the one or more uplink transmissions, and transmitting the one or more uplink transmissions in accordance with the frequency hopping pattern and the retuning operation.

A non-transitory computer-readable medium storing code for wireless communications at a UE is described. The code may include instructions executable by a processor to identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots, identify a set of symbols at an end of a last slot of the first set of frequency resources for performing a retuning operation prior to a retransmission of the one or more uplink transmissions, and transmit the one or more uplink transmissions in accordance with the frequency hopping pattern and the retuning operation.

Some examples of the method, apparatuses, and non-transitory computer-readable medium described herein may further include operations, features, means, or instructions for identifying a resource block offset indicating a number of resource blocks between a first resource block of the first set of frequency resources and a first resource block of the second set of frequency resources, where identifying that the one or more uplink transmissions may be to be retransmitted may be based on identifying the resource block offset.

Some instances of the method, apparatuses, and non-transitory computer-readable medium described herein may further include operations, features, means, or instructions for determining, based on the resource block offset, whether a range of the second set of frequency resources exceeds a maximum bandwidth of the UE or may be within a maximum bandwidth of the UE.

Some cases of the method, apparatuses, and non-transitory computer-readable medium described herein may further include operations, features, means, or instructions for dropping the retransmission during the second set of slots based on determining that the range of the second set of frequency resources exceeds the maximum bandwidth of the UE.

Some examples of the method, apparatuses, and non-transitory computer-readable medium described herein may further include operations, features, means, or instructions for transmitting the retransmission during the second set of slots using a portion of resource blocks of the second set of frequency resources within the maximum bandwidth of the UE, where transmitting the retransmission may be based on determining that the range of the second set of frequency resources exceed the maximum bandwidth of the UE.

Some examples of the method, apparatuses, and non-transitory computer-readable medium described herein may further include operations, features, means, or instructions for determining more than one bandwidth part configuration, where each bandwidth part configuration includes a set of frequency resources and a first bandwidth part configuration includes the first set of frequency resources and a second bandwidth part configuration includes the second set of frequency resources, and receiving an indication of the frequency hopping pattern that includes an index list selecting the first and second bandwidth part configurations or an indication of an offset of a second bandwidth part configuration index relative to a first bandwidth part configuration index.

Some examples of the method, apparatuses, and non-transitory computer-readable medium described herein may further include operations, features, means, or instructions for determining the first set of frequency resources based on a first bandwidth of the first set of frequency resources and a first center frequency of the first bandwidth of the first set of frequency resources, and determining the second set of frequency resources based on the first bandwidth of the first set of frequency resources and a second center frequency indicated by the frequency hopping pattern, where a second bandwidth of the second set of frequency resources equals the first bandwidth of the first set of frequency resources.

In some examples of the method, apparatuses, and non-transitory computer-readable medium described herein, a first number of slots within the first set of slots and a second number of slots within the second set of slots may be based on a mobility of the UE, a retuning requirement, a configuration of the one or more uplink transmissions, a reference signal received power, a signal to interference-plus-noise ratio, or a combination thereof.

In some examples of the method, apparatuses, and non-transitory computer-readable medium described herein, a first bandwidth part associated with the first set of frequency resources spans a same number of resource blocks as a second bandwidth part associated with the second set of frequency resources.

Some examples of the method, apparatuses, and non-transitory computer-readable medium described herein may further include operations, features, means, or instructions for determining a position within the first bandwidth part of a starting resource block of the first set of frequency resources, and determining that a position within the second bandwidth part of a starting resource block of the second set of frequency resources may be the same as the position within the first bandwidth part based on the first bandwidth part spanning the same number of resource blocks as the second bandwidth part.

In some examples of the method, apparatuses, and non-transitory computer-readable medium described herein, a first bandwidth part associated with the first set of frequency resources spans fewer resource blocks than a second bandwidth part associated with the second set of frequency resources, the first set of frequency resources spans fewer resource blocks than the second set of frequency resources, and the first set of slots includes more slots than the second set of slots.

In some examples of the method, apparatuses, and non-transitory computer-readable medium described herein, a first bandwidth part associated with the first set of frequency resources spans more resource blocks than a second bandwidth part associated with the second set of frequency resources.

In some examples of the method, apparatuses, and non-transitory computer-readable medium described herein, the first set of frequency resources spans more resource blocks than the second set of frequency resources, and the first set of slots includes fewer slots than the second set of slots.

Some examples of the method, apparatuses, and non-transitory computer-readable medium described herein may further include operations, features, means, or instructions for dropping a portion of the one or more uplink transmissions from the second set of frequency resources, where the portion of the one or more uplink transmissions may be mapped to resource blocks outside of the second bandwidth part.

In some examples of the method, apparatuses, and non-transitory computer-readable medium described herein, transmitting the one or more uplink transmissions further may include operations, features, means, or instructions for transmitting the one or more uplink transmissions during the first set of slots and within the first set of frequency resources, performing the retuning operation during the set of symbols, and transmitting the one or more uplink transmissions during the second set of slots and within the second set of frequency resources after performing the retuning operation.

Some examples of the method, apparatuses, and non-transitory computer-readable medium described herein may further include operations, features, means, or instructions for transmitting, to a base station, an indication of a number of symbols within the set of symbols, where the number of symbols may be based on a capability of the UE.

Some examples of the method, apparatuses, and non-transitory computer-readable medium described herein may further include operations, features, means, or instructions for determining that a portion of a first slot of the second set of slots may be configured to transmit a demodulation reference signal, where the set of symbols may be within the last slot of the first set of slots based on the determining.

Some examples of the method, apparatuses, and non-transitory computer-readable medium described herein may further include operations, features, means, or instructions for determining that an uplink transmission within the last slot includes uplink control information, and increasing a first transmission power of the last slot relative to a second transmission power of a remaining portion of the first set of slots based on determining that the uplink transmission includes uplink control information.

In some examples of the method, apparatuses, and non-transitory computer-readable medium described herein, the one or more uplink transmissions may be physical random access channel (PRACH) transmissions.

Some examples of the method, apparatuses, and non-transitory computer-readable medium described herein may further include operations, features, means, or instructions for determining that a coverage associated with the UE may be below a threshold, where identifying that the one or more uplink transmissions may be to be retransmitted may be based on determining that the coverage associated with the UE may be below the threshold.

In some examples of the method, apparatuses, and non-transitory computer-readable medium described herein, the first set of slots within the first set of frequency resources includes a default PRACH transmission occasion.

In some examples of the method, apparatuses, and non-transitory computer-readable medium described herein, the default PRACH transmission occasion may be configured to be used by a first UE type with a limited or reduced capability or complexity and a second UE type with a standard capability or complexity. For example, the first UE type may have a limited capability or complexity in terms of at least one of supported maximum bandwidth, data rate, antenna number, antenna size, transmit power, and power consumption requirement, etc.

In some examples of the method, apparatuses, and non-transitory computer-readable medium described herein, the first set of slots within the first set of frequency resources and the second set of slots within the second set of frequency resources may be different transmission occasions than a default PRACH transmission occasion.

In some examples of the method, apparatuses, and non-transitory computer-readable medium described herein, the UE may have a limited capability and may be configured to refrain from transmitting during the default PRACH transmission occasion.

A method of wireless communications at a UE is described. The method may include identifying that one or more uplink transmissions are to be transmitted by the UE during a first set of slots and within a first set of frequency resources, identifying that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots, and transmitting the one or more uplink transmissions in accordance with the frequency hopping pattern.

An apparatus for wireless communications at a UE is described. The apparatus may include a processor, memory coupled with the processor, and instructions stored in the memory. The instructions may be executable by the processor to cause the apparatus to identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots, and transmit the one or more uplink transmissions in accordance with the frequency hopping pattern.

Another apparatus for wireless communications at a UE is described. The apparatus may include means for identifying that one or more uplink transmissions are to be transmitted by the UE during a first set of slots and within a first set of frequency resources, identifying that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots, and transmitting the one or more uplink transmissions in accordance with the frequency hopping pattern.

A non-transitory computer-readable medium storing code for wireless communications at a UE is described. The code may include instructions executable by a processor to identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots, and transmit the one or more uplink transmissions in accordance with the frequency hopping pattern.

Some examples of the method, apparatuses, and non-transitory computer-readable medium described herein may further include operations, features, means, or instructions for determining more than one bandwidth part configuration, where each bandwidth part configuration includes a set of frequency resources and a first bandwidth part configuration includes the first set of frequency resources and a second bandwidth part configuration includes the second set of frequency resources, and receiving an indication of the frequency hopping pattern that includes an index list selecting the first and second bandwidth part configuration or an indication of an offset of a second bandwidth part configuration index relative to a first bandwidth part configuration index.

Some examples of the method, apparatuses, and non-transitory computer-readable medium described herein may further include operations, features, means, or instructions for determining the first set of frequency resources based on a first bandwidth of the first set of frequency resources and a first center frequency of the first bandwidth of the first set of frequency resources, and determining the second set of frequency resources based on the first bandwidth of the first set of frequency resources and a second center frequency indicated by the frequency hopping pattern, where a second bandwidth of the second set of frequency resources equals the first bandwidth of the first set of frequency resources.

In some examples of the method, apparatuses, and non-transitory computer-readable medium described herein, a first number of slots within the first set of slots and a second number of slots within the second set of slots may be based on a mobility of the UE, a retuning requirement, a configuration of the one or more uplink transmissions, a reference signal received power, a signal to interference-plus-noise ratio, or a combination thereof.

In some examples of the method, apparatuses, and non-transitory computer-readable medium described herein, transmitting the one or more uplink transmissions further may include operations, features, means, or instructions for transmitting the one or more uplink transmissions during the first set of slots and within the first set of frequency resources, performing a retuning operation during a set of symbols, where the set of symbols may be at an end of a last slot of the first set of slots or at the beginning of a first slot of the second set of slots, and transmitting the one or more uplink transmissions during the second set of slots and within the second set of frequency resources after the retuning operation.

Some examples of the method, apparatuses, and non-transitory computer-readable medium described herein may further include operations, features, means, or instructions for determining that a portion of the first slot of the second set of slots may be reserved for control signaling, where the set of symbols may be within the portion of the first slot of the second set of slots based on the determining.

Some examples of the method, apparatuses, and non-transitory computer-readable medium described herein may further include operations, features, means, or instructions for determining that a portion of the first slot of the second set of slots may be configured to transmit a demodulation reference signal, where the set of symbols may be at the end of the last slot of the first set of slots based on the determining.

Some examples of the method, apparatuses, and non-transitory computer-readable medium described herein may further include operations, features, means, or instructions for transmitting, to a base station, an indication of a number of symbols within the set of symbols, where the number of symbols may be based on a capability of the UE.

Some examples of the method, apparatuses, and non-transitory computer-readable medium described herein may further include operations, features, means, or instructions for determining that an uplink transmission within the last slot includes uplink control information, and increasing a first transmission power of the last slot relative to a second transmission power of a remaining portion of the first set of slots based on determining that the uplink transmission includes uplink control information.

In some examples of the method, apparatuses, and non-transitory computer-readable medium described herein, the one or more uplink transmissions may be PRACH transmissions.

Some examples of the method, apparatuses, and non-transitory computer-readable medium described herein may further include operations, features, means, or instructions for determining that a coverage associated with the UE may be below a threshold, where identifying that the one or more uplink transmissions may be to be retransmitted may be based on determining that the coverage associated with the UE may be below the threshold.

In some examples of the method, apparatuses, and non-transitory computer-readable medium described herein, the first set of slots within the first set of frequency resources includes a default PRACH transmission occasion.

In some examples of the method, apparatuses, and non-transitory computer-readable medium described herein, the default PRACH transmission occasion may be configured to be used by a first UE with a limited capability or complexity and a second UE with a standard capability or complexity.

In some examples of the method, apparatuses, and non-transitory computer-readable medium described herein, the first set of slots within the first set of frequency resources and the second set of slots within the second set of frequency resources may be different transmission occasions than a default PRACH transmission occasion.

In some examples of the method, apparatuses, and non-transitory computer-readable medium described herein, the UE may have a limited capability and may be configured to refrain from transmitting during the default PRACH transmission occasion.

In some examples of the method, apparatuses, and non-transitory computer-readable medium described herein, the first set of frequency resources spans a same number of resource blocks as the second set of frequency resources.

In some examples of the method, apparatuses, and non-transitory computer-readable medium described herein, the first set of frequency resources spans fewer resource blocks than the second set of frequency resources, and the first set of slots includes more slots than the second set of slots.

In some examples of the method, apparatuses, and non-transitory computer-readable medium described herein, the first set of frequency resources spans more resource blocks than the second set of frequency resources.

In some examples of the method, apparatuses, and non-transitory computer-readable medium described herein, the first set of slots includes fewer slots than the second set of slots.

Some examples of the method, apparatuses, and non-transitory computer-readable medium described herein may further include operations, features, means, or instructions for dropping a portion of the one or more uplink transmissions from the second set of frequency resources, where the portion of the one or more uplink transmissions may be mapped to resource blocks outside of the second set of frequency resources.

A method of wireless communications at a base station is described. The method may include identifying a frequency hopping pattern that provides for at least intra-bandwidth part frequency hopping for uplink communications from a UE, monitoring, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE, and monitoring for retransmissions of the one or more uplink transmissions during a second set of slots and within a second set of frequency resources that are different from the first set of frequency resources in accordance with the frequency hopping pattern, where the first set of slots and the second set of slots each include two or more slots.

An apparatus for wireless communications at a base station is described. The apparatus may include a processor, memory coupled with the processor, and instructions stored in the memory. The instructions may be executable by the processor to cause the apparatus to identify a frequency hopping pattern that provides for at least intra-bandwidth part frequency hopping for uplink communications from a UE, monitor, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots.

Another apparatus for wireless communications at a base station is described. The apparatus may include means for identifying a frequency hopping pattern that provides for at least intra-bandwidth part frequency hopping for uplink communications from a UE, monitoring, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE, and monitoring for retransmissions of the one or more uplink transmissions during a second set of slots and within a second set of frequency resources that are different from the first set of frequency resources in accordance with the frequency hopping pattern, where the first set of slots and the second set of slots each include two or more slots.

A non-transitory computer-readable medium storing code for wireless communications at a base station is described. The code may include instructions executable by a processor to identify a frequency hopping pattern that provides for at least intra-bandwidth part frequency hopping for uplink communications from a UE, monitor, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots.

In some examples of the method, apparatuses, and non-transitory computer-readable medium described herein, identifying the frequency hopping pattern further may include operations, features, means, or instructions for identifying a resource block offset indicating a number of resource blocks between a first resource block of the first set of frequency resources and a first resource block of the second set of frequency resources, where identifying that the one or more uplink transmissions may be to be retransmitted may be based on identifying the resource block offset.

In some examples of the method, apparatuses, and non-transitory computer-readable medium described herein, a range of the second set of frequency resources exceeds a maximum bandwidth of the UE.

Some examples of the method, apparatuses, and non-transitory computer-readable medium described herein may further include operations, features, means, or instructions for failing to receive a retransmission of the one or more uplink transmissions during the second set of slots based on the range of the second set of frequency resources exceeding the maximum bandwidth of the UE.

Some examples of the method, apparatuses, and non-transitory computer-readable medium described herein may further include operations, features, means, or instructions for receiving a retransmission of the one or more uplink transmissions within a portion of resource blocks of the second set of frequency resources within the maximum bandwidth of the UE, where receiving the retransmission within the portion of resource blocks may be based on the range of the second set of frequency resources exceeding the maximum bandwidth of the UE.

Some examples of the method, apparatuses, and non-transitory computer-readable medium described herein may further include operations, features, means, or instructions for determining more than one bandwidth part configuration, where each bandwidth part configuration includes a set of frequency resources and a first bandwidth part configuration includes the first set of frequency resources and a second bandwidth part configuration includes the second set of frequency resources, and transmitting an indication of the frequency hopping pattern that includes an index list selecting the first and second bandwidth part configuration or an indication of an offset of a second bandwidth part configuration index relative to a first bandwidth part configuration index.

In some examples of the method, apparatuses, and non-transitory computer-readable medium described herein, identifying the frequency hopping pattern further may include operations, features, means, or instructions for determining the first set of frequency resources based on a first bandwidth of the first set of frequency resources and a first center frequency of the first bandwidth of the first set of frequency resources, and determining the second set of frequency resources based on the first bandwidth of the first set of frequency resources and a second center frequency indicated by the frequency hopping pattern, where a second bandwidth of the second set of frequency resources equals the first bandwidth of the first set of frequency resources.

In some examples of the method, apparatuses, and non-transitory computer-readable medium described herein, a first number of slots within the first set of slots and a second number of slots within the second set of slots may be based on a mobility of the UE, a retuning requirement, a configuration of the one or more uplink transmissions, a reference signal received power, a signal to interference-plus-noise ratio, or a combination thereof.

In some examples of the method, apparatuses, and non-transitory computer-readable medium described herein, a first bandwidth part associated with the first set of frequency resources spans a same number of resource blocks as a second bandwidth part associated with the second set of frequency resources.

Some examples of the method, apparatuses, and non-transitory computer-readable medium described herein may further include operations, features, means, or instructions for determining a position within the first bandwidth part of a starting resource block of the first set of frequency resources, and determining that a position within the second bandwidth part of a starting resource block of the second set of frequency resources may be the same as the position within the first bandwidth part based on the first bandwidth part spanning the same number of resource blocks as the second bandwidth part.

In some examples of the method, apparatuses, and non-transitory computer-readable medium described herein, a first bandwidth part associated with the first set of frequency resources spans fewer resource blocks than a second bandwidth part associated with the second set of frequency resources, the first set of frequency resources spans fewer resource blocks than the second set of frequency resources, and the first set of slots includes more slots than the second set of slots.

In some examples of the method, apparatuses, and non-transitory computer-readable medium described herein, a first bandwidth part associated with the first set of frequency resources spans more resource blocks than a second bandwidth part associated with the second set of frequency resources.

In some examples of the method, apparatuses, and non-transitory computer-readable medium described herein, the first set of frequency resources spans more resource blocks than the second set of frequency resources, and the first set of slots includes fewer slots than the second set of slots.

Some examples of the method, apparatuses, and non-transitory computer-readable medium described herein may further include operations, features, means, or instructions for receiving the retransmission of one or more uplink transmissions, where a portion of the one or more uplink transmissions may be dropped from the second set of frequency resources, and where the portion of the one or more uplink transmissions may be mapped to resource blocks outside of the second bandwidth part.

Some examples of the method, apparatuses, and non-transitory computer-readable medium described herein may further include operations, features, means, or instructions for receiving the one or more uplink transmissions during the first set of slots and within the first set of frequency resources based on monitoring for one or more uplink transmissions during the first set of slots and within the first set of frequency resources, and receiving the one or more uplink transmissions during the second set of slots and within the second set of frequency resources based on monitoring for retransmissions, where receiving the one or more uplink transmissions during the second set of slots occurs after the UE performs the retuning operation during the set of symbols within the last slot of the first set of slots.

Some examples of the method, apparatuses, and non-transitory computer-readable medium described herein may further include operations, features, means, or instructions for receiving, from the UE, an indication of a number of symbols within the set of symbols, where the number of symbols may be based on a capability of the UE.

In some examples of the method, apparatuses, and non-transitory computer-readable medium described herein, a portion of a first slot of the second set of slots may be configured to transmit a demodulation reference signal, and the set of symbols may be at the end of the last slot of the first set of slots based on the portion of the first slot being configured to transmit the demodulation reference signal.

In some examples of the method, apparatuses, and non-transitory computer-readable medium described herein, the one or more uplink transmissions may be PRACH transmissions.

Some examples of the method, apparatuses, and non-transitory computer-readable medium described herein may further include operations, features, means, or instructions for determining that a coverage associated with the UE may be below a threshold, where monitoring for retransmissions may be based on determining that the coverage associated with the UE may be below the threshold.

In some examples of the method, apparatuses, and non-transitory computer-readable medium described herein, the first set of slots within the first set of frequency resources includes a default PRACH transmission occasion.

In some examples of the method, apparatuses, and non-transitory computer-readable medium described herein, the default PRACH transmission occasion may be configured to be used by a first UE with a limited capability and a second UE with a standard capability.

In some examples of the method, apparatuses, and non-transitory computer-readable medium described herein, the first set of slots within the first set of frequency resources and the second set of slots within the second set of frequency resources may be different transmission occasions than a default PRACH transmission occasion.

In some examples of the method, apparatuses, and non-transitory computer-readable medium described herein, the UE may have a limited capability and may be configured to refrain from transmitting during the default PRACH transmission occasion.

A method of wireless communications at a base station is described. The method may include identifying a frequency hopping pattern that provides for inter-bandwidth part frequency hopping for uplink communications from a UE, monitoring, in accordance with the frequency hopping pattern, for one or more uplink transmissions from the UE during a first set of slots and within a first set of frequency resources, and monitoring for retransmissions of the one or more uplink transmissions during a second set of slots and within a second set of frequency resources that are different from the first set of frequency resources in accordance with the frequency hopping pattern, where the first set of slots and the second set of slots each include two or more slots.

An apparatus for wireless communications at a base station is described. The apparatus may include a processor, memory coupled with the processor, and instructions stored in the memory. The instructions may be executable by the processor to cause the apparatus to identify a frequency hopping pattern that provides for inter-bandwidth part frequency hopping for uplink communications from a UE, monitor, in accordance with the frequency hopping pattern, for one or more uplink transmissions from the UE during a first set of slots and within a first set of frequency resources, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots.

Another apparatus for wireless communications at a base station is described. The apparatus may include means for identifying a frequency hopping pattern that provides for inter-bandwidth part frequency hopping for uplink communications from a UE, monitoring, in accordance with the frequency hopping pattern, for one or more uplink transmissions from the UE during a first set of slots and within a first set of frequency resources, and monitoring for retransmissions of the one or more uplink transmissions during a second set of slots and within a second set of frequency resources that are different from the first set of frequency resources in accordance with the frequency hopping pattern, where the first set of slots and the second set of slots each include two or more slots.

A non-transitory computer-readable medium storing code for wireless communications at a base station is described. The code may include instructions executable by a processor to identify a frequency hopping pattern that provides for inter-bandwidth part frequency hopping for uplink communications from a UE, monitor, in accordance with the frequency hopping pattern, for one or more uplink transmissions from the UE during a first set of slots and within a first set of frequency resources, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots.

Some examples of the method, apparatuses, and non-transitory computer-readable medium described herein may further include operations, features, means, or instructions for determining more than one bandwidth part configuration, where each bandwidth part configuration includes a set of frequency resources and a first bandwidth part configuration includes the first set of frequency resources and a second bandwidth part configuration includes the second set of frequency resources, and transmitting an indication of the frequency hopping pattern that includes an index list selecting the first and second bandwidth part configuration or an indication of an offset of a second bandwidth part configuration index relative to a first bandwidth part configuration index.

In some examples of the method, apparatuses, and non-transitory computer-readable medium described herein, identifying the frequency hopping pattern further may include operations, features, means, or instructions for determining the first set of frequency resources based on a first bandwidth of the first set of frequency resources and a first center frequency of the first bandwidth of the first set of frequency resources, and determining the second set of frequency resources based on the first bandwidth of the first set of frequency resources and a second center frequency indicated by the frequency hopping pattern, where a second bandwidth of the second set of frequency resources equals the first bandwidth of the first set of frequency resources.

In some examples of the method, apparatuses, and non-transitory computer-readable medium described herein, a first number of slots within the first set of slots and a second number of slots within the second set of slots may be based on a mobility of the UE, a retuning requirement, a configuration of the one or more uplink transmissions, a reference signal received power, a signal to interference-plus-noise ratio, or a combination thereof.

Some examples of the method, apparatuses, and non-transitory computer-readable medium described herein may further include operations, features, means, or instructions for receiving the one or more uplink transmissions during the first set of slots and within the first set of frequency resources based on monitoring for one or more uplink transmissions during the first set of slots and within the first set of frequency resources, and receiving the one or more uplink transmissions during the second set of slots and within the second set of frequency resources based on monitoring for retransmissions, where receiving the one or more uplink transmissions during the second set of slots occurs after the UE performs a retuning operation during a set of symbols at an end of a last slot of the first set of slots or at the beginning of a first slot of the second set of slots.

Some examples of the method, apparatuses, and non-transitory computer-readable medium described herein may further include operations, features, means, or instructions for receiving, from the UE, an indication of a number of symbols within the set of symbols, where the number of symbols may be based on a capability of the UE.

In some examples of the method, apparatuses, and non-transitory computer-readable medium described herein, a portion of the first slot of the second set of slots may be reserved for control signaling, and the set of symbols may be within the portion of the first slot of the second set of slots based on the portion of the first slot being reserved for control signaling.

In some examples of the method, apparatuses, and non-transitory computer-readable medium described herein, a portion of the first slot of the second set of slots may be configured to transmit a demodulation reference signal, and the set of symbols may be at the end of the last slot of the first set of slots based on the portion of the first slot being configured to transmit the demodulation reference signal.

In some examples of the method, apparatuses, and non-transitory computer-readable medium described herein, the one or more uplink transmissions may be PRACH transmissions.

Some examples of the method, apparatuses, and non-transitory computer-readable medium described herein may further include operations, features, means, or instructions for determining that a coverage associated with the UE may be below a threshold, where monitoring for retransmissions may be based on determining that the coverage associated with the UE may be below the threshold.

In some examples of the method, apparatuses, and non-transitory computer-readable medium described herein, the first set of slots within the first set of frequency resources includes a default PRACH transmission occasion.

In some examples of the method, apparatuses, and non-transitory computer-readable medium described herein, the default PRACH transmission occasion may be configured to be used by a first UE with a limited capability or complexity and a second UE with a standard capability or complexity.

In some examples of the method, apparatuses, and non-transitory computer-readable medium described herein, the first set of slots within the first set of frequency resources and the second set of slots within the second set of frequency resources may be different transmission occasions than a default PRACH transmission occasion.

In some examples of the method, apparatuses, and non-transitory computer-readable medium described herein, the UE may have a limited capability and may be configured to refrain from transmitting during the default PRACH transmission occasion.

In some examples of the method, apparatuses, and non-transitory computer-readable medium described herein, the first set of frequency resources spans a same number of resource blocks as the second set of frequency resources.

In some examples of the method, apparatuses, and non-transitory computer-readable medium described herein, the first set of frequency resources spans fewer resource blocks than the second set of frequency resources, and the first set of slots includes more slots than the second set of slots.

In some examples of the method, apparatuses, and non-transitory computer-readable medium described herein, the first set of frequency resources spans more resource blocks than the second set of frequency resources.

In some examples of the method, apparatuses, and non-transitory computer-readable medium described herein, the first set of slots includes fewer slots than the second set of slots.

BRIEF DESCRIPTION OF THE DRAWINGS

FIGS. 3A through 7B illustrates examples of frequency hopping patterns that support frequency hopping with slot bundling in accordance with aspects of the present disclosure.

DETAILED DESCRIPTION

Figure 1:
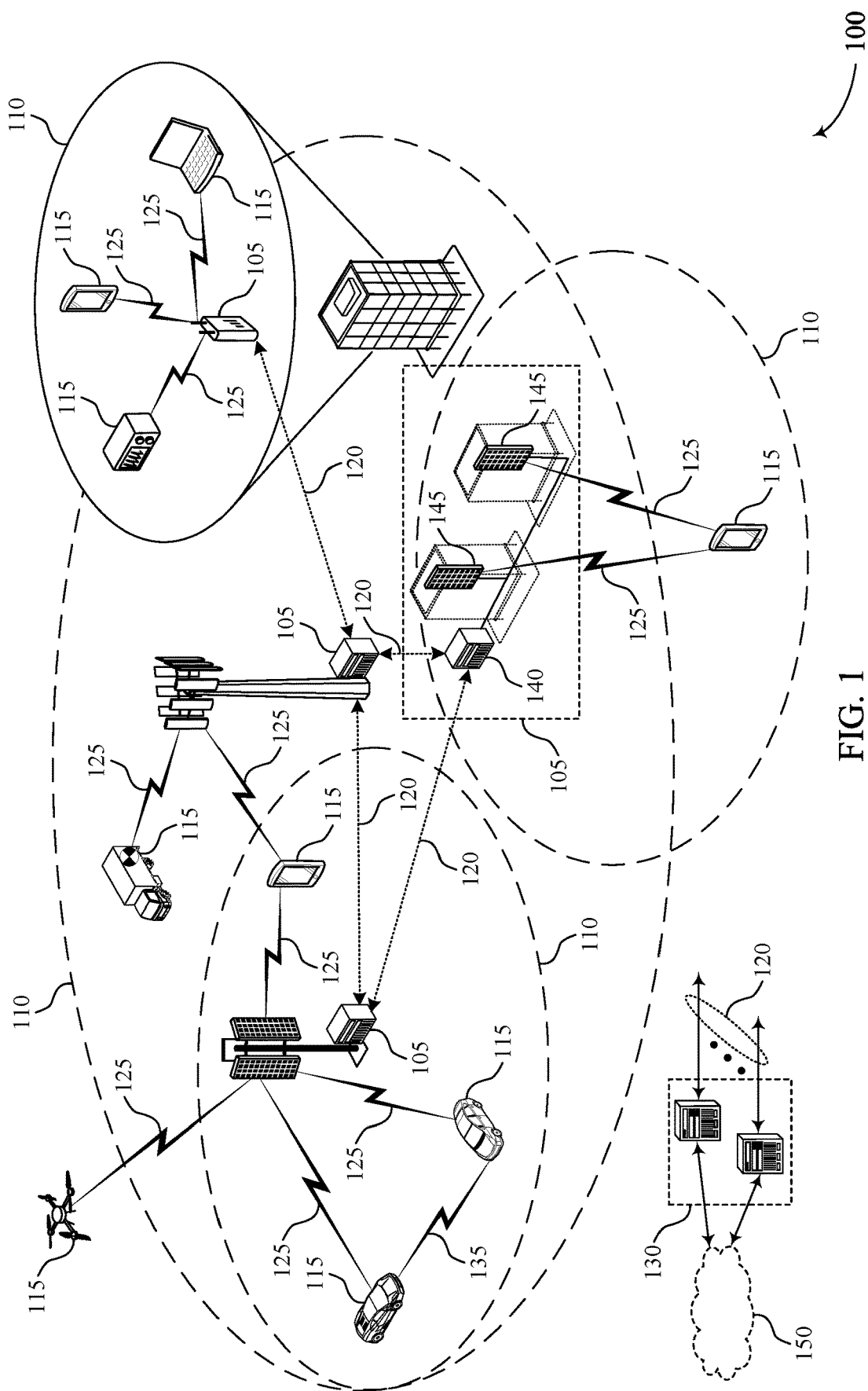
FIG. 1 illustrates an example of a system for wireless communication that supports frequency hopping with slot bundling in accordance with aspects of the present disclosure.

The described techniques relate to improved methods, systems, devices, and apparatuses for frequency hopping with slot bundling. A user equipment (UE) may be configured to transmit uplink communications to a base station over different frequency ranges (which may also be referred to as "narrow subbands"). That is, the UE may transmit a first uplink transmission over a first frequency range and a second transmission over a second frequency range. The operation of transmitting over different frequency ranges may be referred to as "frequency hopping." In some cases, the UE may perform frequency hopping for uplink transmissions according to a frequency hopping pattern. The frequency hopping pattern may indicate that a UE is to perform transmissions over particular frequency ranges in a particular order and within a prescribed period. For example, the frequency hopping pattern may define a first set of resources for a first uplink transmission and a second set of resources for the following uplink transmission (which may be a retransmission of the first uplink transmission).

Both the first and second sets of resources may also be used for bundled transmissions. For example, one or more first uplink transmissions may be transmitted during the first set of resources, and one or more second uplink transmissions may also be transmitted during the first set of resources. The first and second uplink transmissions may thus be bundled together. Subsequent transmissions (for example, retransmissions of the first and second uplink transmissions) may also be bundled on the second set of resources. A frequency hopping configuration may indicate a number of slots (e.g., two, three, four slots) and a frequency range to be used for an uplink transmission within each of the sets of resources. The UE may use frequency hopping during a random access procedure (e.g., for transmitting physical random access channel (PRACH) transmission) and during uplink transmissions after establishing a connection with the base station.

In some cases, the frequency hopping pattern may be an inter-bandwidth part frequency hopping pattern that indicates for the UE to transmit uplink transmissions at different frequency ranges within different bandwidth parts. In some other cases, the frequency hopping pattern may be an intra-bandwidth part frequency hopping pattern that indicates for the UE to transmit uplink transmissions at different frequency ranges within a same bandwidth part. In either case, the UE may perform a retuning operation prior to transmitting over a new frequency range. For example, the UE may perform a first uplink transmission over a first set of resources indicated by the frequency hopping pattern. Prior to transmitting a second uplink transmission over a second set of resources indicated by the frequency hopping pattern, the UE may perform the retuning operation to determine phase information relevant to the second set of resources. The UE may perform the retuning operation during a last portion of the first set of resources or during a first portion of the second set of resources.

Aspects of the disclosure are initially described in the context of wireless communications systems. Aspects of the disclosure are then described in the context of frequency hopping patterns and a process flow. Aspects of the disclosure are further illustrated by and described with reference to apparatus diagrams, system diagrams, and flowcharts that relate to frequency hopping with slot bundling.

FIG. 1 illustrates an example of a wireless communications system 100 that supports frequency hopping with slot bundling in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may include devices such as wearable technology (e.g., smart watches), industrial sensors, or video and surveillance cameras. These UEs 115 may have relatively limited complexity and/or limited size (e.g., when compared to other types of UEs 115 such as mobile phones). For example, these UEs 115 may have a limited bandwidth (e.g., 5 MHz, 10 MHz, 20 MHz). In some other examples, these UEs 115 may further have a lower maximum transmission power (e.g., 20 dBm, 14 dBm) and less antennas (e.g., 1 or two receiving antennas). In some cases, the limited complexity may increase a battery life of a UE 115 (e.g., to several years). These UEs 115 may be designed to communicate in wireless communications systems 100 including enhanced mobile broadband (eMBB) communications, ultra-reliability and low latency (URLLC) communications, LTE NB-IoT communications, and/or MTC communications. In some cases, when a UE 115 transmits with relatively low power or lower transmission antenna gain due to a limited antenna size, the UE 115 may transmit over a narrow bandwidth to achieve a higher concentration of transmission power. It may be desirable for UEs 115 transmitting over a narrow bandwidth to achieve frequency diversity by retransmitting a transmission over a second narrow bandwidth, thus increasing a reliability of the transmission.

A wireless communications system 100 may enable a UE 115 to transmit uplink communications to a base station 105 over different frequency ranges (which may also be referred to as "narrow subbands"). That is, the UE 115 may transmit a first uplink transmission over a first frequency range and a second transmission over a second frequency range. The operation of transmitting over different frequency ranges may be referred to as "frequency hopping." Frequency hopping may increase a reliability of communications between a UE 115 and a base station 105. For example, frequency hopping may add frequency diversity where a UE 115 transmits an initial transmission over a first set of frequency resources and retransmits the transmission over a different set of frequency resources. A base station 105 may monitor for an uplink transmission from the UE 115 on the first and second sets of frequency resources, thus increasing a likelihood that the base station 105 successfully receives and decodes the transmission.

Hopping from a first set of frequency resources to a second set of frequency resources may introduce a phase continuity break. In particular, hopping from a first set of frequency resources within a first bandwidth part to a second set of frequency resources within a different bandwidth part may introduce the phase continuity break. As a result, the UE 115 may perform a retuning operation prior to transmitting over the second set of frequency resources. The retuning operation may enable the UE 115 to determine phase information relevant to the second set of frequency resources. In some cases, it may be desirable to decrease a frequency of retuning operations (e.g., to decrease latency). As a result, the UE 115 may transmit for multiple slots (e.g., as opposed to a single slot) on each of the frequency resources.

The UE 115 may perform frequency hopping for uplink transmissions according to a frequency hopping pattern. The frequency hopping pattern may indicate that a UE is to perform transmissions over particular frequency ranges in a particular order and within a prescribed period. For example, the frequency hopping pattern may define a first set of resources for a first uplink transmission and a second set of resources for the following uplink transmission. Both the first and second sets of resources may indicate a number of slots (e.g., two, three, four slots) and a frequency range for the uplink transmission. The uplink transmission may thus be transmitted and retransmitted within each of the frequency ranges of the frequency hopping pattern. The uplink transmission may also be bundled with other uplink transmissions on additional slots within each frequency range (as defined by the frequency hopping pattern). The UE 115 may use frequency hopping during a random access procedure (e.g., for transmitting a PRACH transmission) and during uplink transmissions after establishing a connection with the base station 105.

The frequency hopping pattern may be an inter-bandwidth part frequency hopping pattern that indicates for the UE 115 to transmit uplink transmissions at different frequency ranges within different bandwidth parts. Additionally or alternatively, the frequency hopping pattern may be an intra-bandwidth part frequency hopping pattern that indicates for the UE 115 to transmit uplink transmissions at different frequency ranges within a same bandwidth part. In either case, the UE 115 may perform a retuning operation prior to transmitting over a new frequency range. For example, the UE 115 may perform a first uplink transmission over a first set of resources indicated by the frequency hopping pattern.

Figure 2:
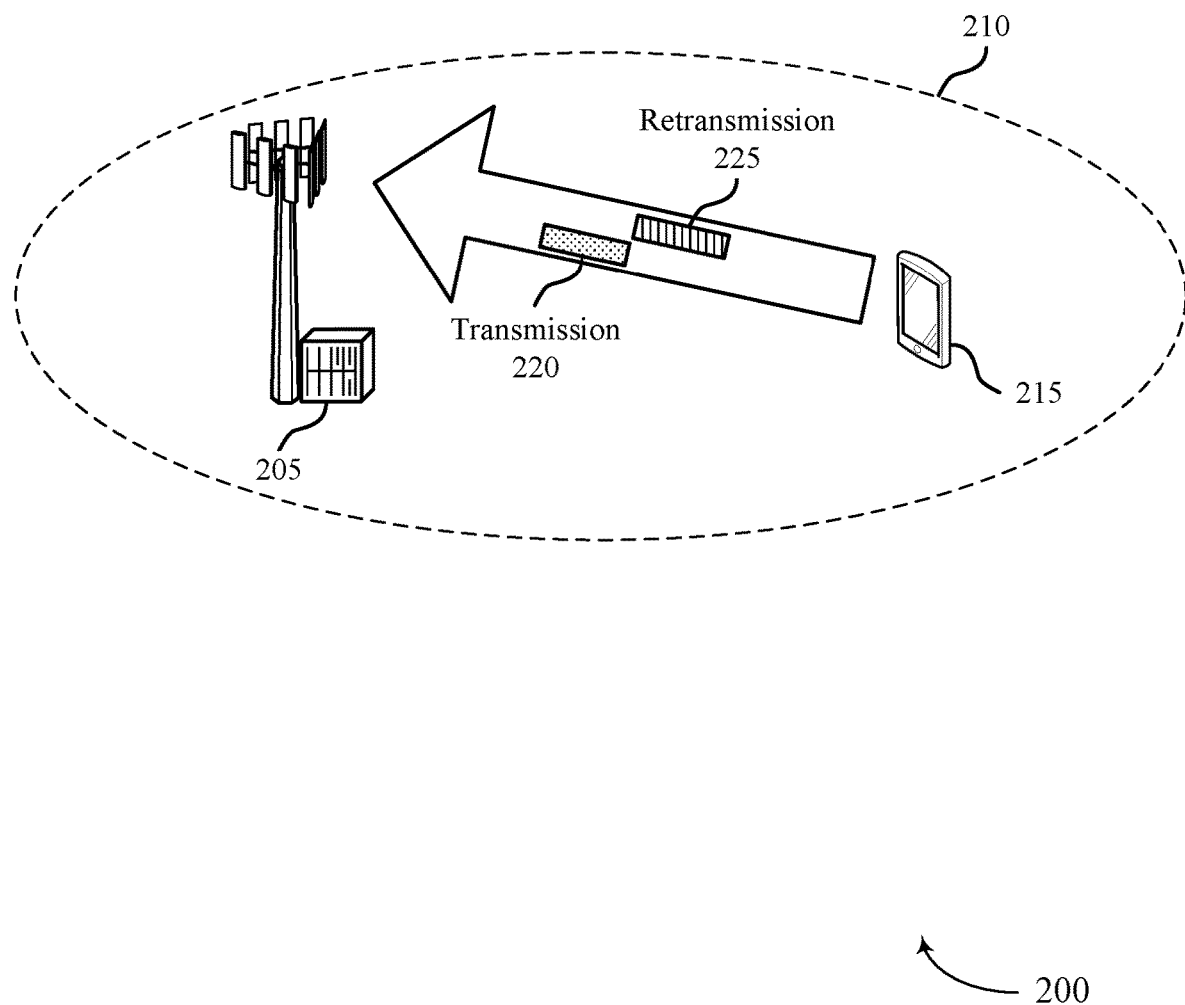
FIG. 2 illustrates an example of a system for wireless communication that supports frequency hopping with slot bundling in accordance with aspects of the present disclosure.

FIG. 2 illustrates an example of a wireless communications system 200 that supports frequency hopping with slot bundling in accordance with various aspects of the present disclosure. Wireless communications system 200 may implement aspects of wireless communications system 100. For example, wireless communications system 200 may include a base station 205 and a UE 215 within a geographic coverage area 210, which may be examples of base stations 105, UEs 115, and geographic coverage areas 110, respectively, as described with reference to FIG. 1. As described above, the UE 215 may transmit uplink transmissions according to a frequency hopping pattern. Here, the UE 215 may transmit a transmission 220 and a retransmission 225 over different frequency resources.

Prior to transmitting the transmission 220, the UE 215 and the base station 205 may identify a frequency hopping pattern for uplink transmissions. In some cases, the base station 205 may indicate the frequency hopping pattern to the UE 215. For example, the base station 205 may indicate a frequency hopping pattern configuration by higher layer signaling (e.g., by radio resource control (RRC) signaling, via a system information block (SIB)). Alternatively, the frequency hopping pattern for the UE 215 may be defined or preconfigured. For example, the base station 205 and the UE 215 may each determine the frequency hopping pattern for the transmission 220 and the retransmission 225 based on known factors (e.g., the mobility of the UE 215, the requirement for retuning operations, the reference signal received power (RSRP), the signal to interference-plus-noise-ratio (SINR)) and defined frequency hopping patterns. In some cases, the frequency hopping pattern may be dynamic and change based on different factors affecting communications between the UE 215 and the base station 205. For example, the base station 205 and UE 215 may adjust a frequency hopping pattern based on factors such as a mobility of the UE 215, a requirement for retuning operations, an RSRP, or an SINR.

The frequency hopping pattern may indicate a first set of frequency resources for the transmission 220 and a second set of frequency resources for a retransmission 225. In some cases, the first set of frequency resources may be a set of resource blocks spanning a relatively narrow frequency range (e.g., 5 MHz). In some cases, the number of resource blocks spanned by the transmission 220 and the retransmission 225 may be a same number of resource blocks. Additionally or alternatively, the frequency hopping pattern may define a different number of resource blocks for the transmission 220 and the retransmission 225.

The frequency hopping pattern may indicate that frequency hopping is performed periodically every X number of slots. For example, the frequency hopping pattern may indicate that frequency hopping is to be performed every two, three, or four slots. Accordingly, the UE 215 may hop between the first set of frequency resources and the second set of frequency resources (or, in some cases, additional sets of frequency resources if the frequency hopping pattern defines more than two sets of frequency resources for frequency hopping) every X number of slots. As the number of slots increases between frequency hopping, a cost associated with performing a retuning operation between every frequency hop may decrease. For example, communications including frequency hopping at every slot (and performing the retuning operation between every slot) may experience more latency when compared to communications where frequency hopping is occurring every six slots. The number of slots at each frequency (e.g., between each frequency hop) may be contiguous. In some cases, the base station 205 may assume that a demodulation reference signal (DMRS) within the number of slots at each frequency are associated which may enable joint channel estimation and phase tracking between the number of slots.

The UE 215 may identify the frequency hopping pattern based on various types of indications, such as a resource block offset indication (e.g., between the transmission 220 or the retransmission 225), a bandwidth part indication, or a center frequency indication. After identifying the frequency hopping pattern, the UE 215 may transmit the transmission 220 and the retransmission 225. The base station 205 may also identify the frequency hopping pattern and monitor resources indicated by the frequency hopping pattern for the transmission 220 and the retransmission 225. In some cases, the UE 215 may transmit the transmission 220 and the retransmission 225 in a same bandwidth part (e.g., during intra-bandwidth frequency hopping). For example, the UE 215 may transmit the transmission 220 using a first set of resource blocks within the bandwidth part and the UE 215 may then transmit the retransmission 225 using a second set of resource blocks also within the same bandwidth part. In some cases, the frequency diversity achieved by frequency hopping within a same bandwidth part may be based on a size of the bandwidth part. For example, a narrower bandwidth part may provide for less frequency diversity than a wider bandwidth part. In some other cases, the UE 215 may transmit the transmission 220 and the retransmission 225 in a different bandwidth part (e.g., during inter-bandwidth frequency hopping). For example, the frequency resources for transmitting the transmission 220 may be in a first bandwidth part while the frequency resources for transmitting the retransmission 225 may be in a second bandwidth part. The frequency hopping pattern may indicate inter-bandwidth frequency hopping, intra-bandwidth frequency hopping, or both inter-bandwidth frequency hopping and intra-bandwidth frequency hopping. For example, the frequency hopping pattern may dictate intra-bandwidth frequency hopping unless a SINR falls below a threshold, in which case the frequency hopping pattern may indicate inter-bandwidth frequency hopping.

The UE 215 may perform a retuning operation prior to transmitting the retransmission 225. The UE 215 may perform the retuning operation at the end of a last slot of the transmission 220 or at the beginning of a first slot of the retransmission 225. In some cases, a phase continuity of the transmission 220 may be broken when the UE 215 hops to the frequency resources for the retransmission 225. For example, if a UE 215 transmits the transmission 220 within a first bandwidth part and the retransmission 225 within a second bandwidth part, the phase continuity between the transmission 220 and the retransmission 225 may break. The retuning operation may enable the UE 215 to determine phase information for transmitting the retransmission 225.

FIGS. 3A-3C illustrate examples of frequency hopping patterns 300 that support frequency hopping with slot bundling in accordance with various aspects of the present disclosure. The frequency hopping patterns 300 may be examples of frequency hopping patterns implemented by wireless communications systems 100 and 200. For example, a UE (e.g., as described with reference to FIGS. 1 and 2) may transmit uplink transmissions to a base station (e.g., as described with reference to FIGS. 1 and 2) according to the frequency hopping patterns 300. Each of the frequency hopping patterns 300 include multiple slots 305 for a transmission (e.g., a transmission 220 as described with reference to FIG. 2) and multiple slots 305 for a retransmission (e.g., a retransmission 225 as described with reference to FIG. 2). The slots 305 for the transmissions span a frequency range 310 that is different than a frequency range 310 for the retransmissions.

The base station and UE may identify the frequency hopping patterns 300 based on a defined or preconfigured frequency hopping pattern configuration. For example, the base station and UE may identify the frequency hopping pattern 300 based on the frequency pattern configuration based on the mobility of the UE, a requirement for retuning operations, an RSRP, or an SINR. In some other cases, the base station may determine the frequency hopping pattern (e.g., based on the mobility of the UE, a requirement for retuning operations, an RSRP, or an SINR if reported by the UE) and indicate the frequency hopping pattern to the UE by SIB or RRC signaling.

FIG. 3A illustrates an example frequency hopping pattern 300-*a*. The frequency hopping pattern 300-*a* may indicate for a transmission to be transmitted within the frequency range 310-*a* and across each of the slots 305-*a*, 305-*b*, 305-*c*, and 305-*d*. The frequency pattern may indicate for a retransmission to be transmitted within the frequency range 310-*b* and across each of the slots 305-*e*, 305-*f*, 305-*g*, and 305-*h*. A UE may identify the frequency hopping pattern 300-*a* and transmit uplink communications to a base station according to the frequency hopping pattern. Likewise, the base station may identify the frequency hopping pattern 300-*a* and monitor for the uplink communications accordingly.

The frequency hopping pattern 300-*a* may be indicated by a resource block offset 325-*a*. The resource block offset 325-*a* may indicate a number of resource blocks between a starting resource block 320-*a* within the frequency range 310-*a* and a starting resource block 320-*b* within the frequency range 310-*b*. In some cases, both the frequency range 310-*a* and frequency range 310-*b* may be in a same bandwidth part. That is, a UE may be configured for transmissions within the bandwidth part and the resource block offset 325-*a* may indicate two frequency ranges 310-*a* and 310-*b* within that bandwidth part. For example, the bandwidth part may span one hundred resource blocks, and the resource block offset 325 may indicate an offset that is less than the bandwidth part span. In some instances, the resource block offset 325 may cause the frequency range 310-*b* to wrap around from a highest resource block of the bandwidth part to a lowest resource block of the bandwidth part. Some UEs may not be capable of transmitting across a bandwidth spanning the lowest resource block and the highest resource block of the bandwidth part. For example, the UE may have a limited capability (e.g., an NR-Light UE or a defined UE type with reduced capability or complexity) and may support a maximum bandwidth that is smaller than the bandwidth part. As a result, the UE may not transmit a portion of the retransmission within slots 305-*e*, 305-*f*, 305-*g*, and 305-*h* if the frequency hopping resource block (RB) offset leads to the wraparound of the RBs in the two edges of the bandwidth. For example, the UE may drop the portion of the retransmission within the slots 305-*e* and 305-*h* that have been wrapped around (e.g., to the lower resource blocks within the bandwidth part) or drop the retransmission within the slots 305-*e* through -305-*h* (e.g., the higher and lower resource blocks of the bandwidth part).

FIG. 3B illustrates an example frequency hopping pattern 300-*b*. The frequency hopping pattern 300-*b* may indicate for a transmission to be transmitted within the frequency range 310-*c* and across each of the slots 305-*i*, 305-*j*, 305-*k*, and 305-*l*. The frequency pattern may indicate for a retransmission to be transmitted within the frequency range 310-*d* and across each of the slots 305-*m*, 305-*n*, 305-*o*, and 305-*p*. A UE may identify the frequency hopping pattern 300-*b* and transmit uplink communications to a base station according to the frequency hopping pattern. Likewise, the base station may identify the frequency hopping pattern 300-*b* and monitor for the uplink communications accordingly.

The frequency hopping pattern 300-*b* may be indicated (e.g., by a list of bandwidth part index) based on selecting a bandwidth part 330 for the transmission and the retransmission. For example, the frequency hopping pattern 300-*b* may indicate for the transmission to be transmitted within the bandwidth part 330-a and the retransmission to be transmitted within the bandwidth part 330-b. Alternatively, the frequency hopping pattern 300-b may be indicated (e.g., by the bandwidth part index offset) based on a relative offset of the bandwidth parts 330 for the transmission and retransmission. Each of the frequency ranges 310 may be smaller than the size of the configured bandwidth part. The configured bandwidth part may have a size no larger than a maximum supported transmission bandwidth of the UE. The UE and base station may determine which resource blocks within the bandwidth parts 330 to utilize for the uplink transmissions based on the resource block offset 325-b. The resource block offset 325-b may indicate a number of resource blocks between a first resource block of the bandwidth part 330 and a starting resource block of the frequency range 310. The same resource block offset 325-b may be used for each bandwidth part. As a result, the relative location of the frequency ranges 310-c and 310-d may be consistent across bandwidth parts 330.

FIG. 3C illustrates an example frequency hopping pattern 300-c. The frequency hopping pattern 300-c may indicate for a transmission to be transmitted within the frequency range 310-e and across each of the slots 305-q, 305-r, 305-s, and 305-t. The frequency pattern may indicate for a retransmission to be transmitted within the frequency range 310-f and across each of the slots 305-u, 305-v, 305-w, and 305-x. A UE may identify the frequency hopping pattern 300-c and transmit uplink communications to a base station according to the frequency hopping pattern. Likewise, the base station may identify the frequency hopping pattern 300-c and monitor for the uplink communications accordingly.

The frequency hopping pattern 300-c may be indicated by a center frequency 335. For example, the frequency range 310-e may be indicated by the center frequency 335-a and the frequency range 310-f may be indicated by the center frequency 335-b. Both the base station and the UE may determine a size of the frequency range 310-e and 310-f. For example, the size of the frequency ranges 310-e and 310-f may be defined (e.g., by a standard) for the UE. Additionally or alternatively, the base station may indicate a size of the frequency ranges 310-e and 310-f In either case, the size of the frequency ranges 310-e and 310-f may be less than a maximum bandwidth of the UE.

Figure 4:
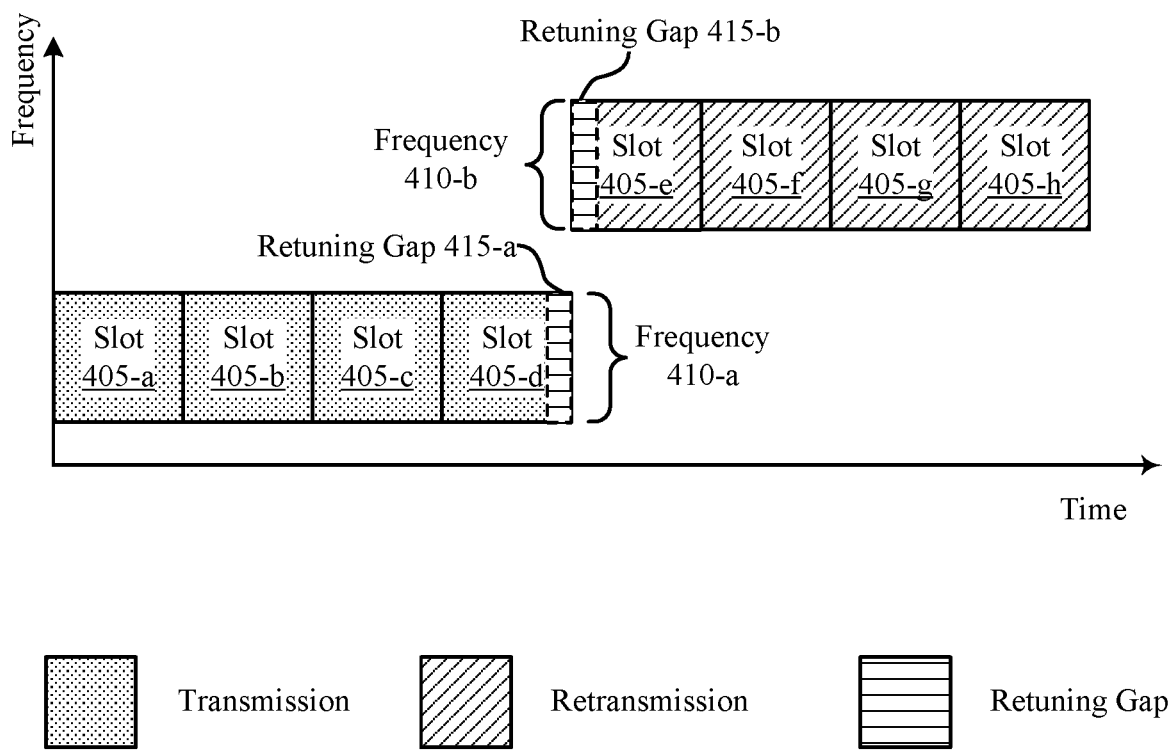

FIG. 4 illustrates an example of a frequency hopping pattern 400 that supports frequency hopping with slot bundling in accordance with various aspects of the present disclosure. The frequency hopping pattern 400 may be an example of any of the frequency hopping patterns as described with reference to FIGS. 3A-3C. Further, the frequency hopping pattern 400 may be implemented by wireless communications systems 100 and 200. For example, a UE (e.g., as described with reference to FIGS. 1 and 2) may transmit uplink transmissions to a base station (e.g., as described with reference to FIGS. 1 and 2) according to the frequency hopping pattern 400. The frequency hopping pattern 400 may include a transmission transmitted within slots 405-a, 405-b, 405-c, and 405-d spanning the frequency range 410-a as well as a retransmission transmitted within slots 405-e, 405-f, 405-g, and 405-h spanning the frequency range 410-b. The frequency hopping pattern may also include optional retuning gaps 415-a and 415-b.

The frequency hopping pattern 400 may include one of the retuning operations (e.g., within one of the retuning gaps 415-a or 415-b). During the retuning operations, a UE may not transmit any uplink communications or receive any downlink communications. In some cases, a retuning operation may be performed when transmitting the retransmission spanning the frequency range 410-b after transmitting the transmission spanning the frequency range 410-a changes the radio frequency (RF) direct current (DC). If a UE determines to perform the retuning operation, the UE may determine to perform the retuning operation in either the retuning gap 415-a, the retuning gap 415-p, or both. The retuning gap 415-a may include a last number of symbols within the last slot 405-d of the transmission while the retuning gap 415-b may include a first number of symbols within the first slot 405-e of the retransmission. The number of symbols within the retuning gap 415 (e.g., one symbol, three symbols) may be based on a capability of the UE.

The retuning gap 415 may include symbols otherwise configured for physical uplink shared channel (PUSCH) or physical uplink control channel (PUCCH) transmissions. Because the PUSCH or PUCCH transmissions include fewer symbols, the UE may transmit the remaining symbols (e.g., not included in the retuning gap 415) at a higher power. In some cases, the UE may puncture the transmission or retransmission on the symbols in the retuning gap 415. For example, the UE may perform the retuning operation during the retuning gap 415 instead of transmitting the contents that would otherwise be included in the symbols of the retuning gap 415. In some other cases, the UE may rate match the contents of the slots 405 around the retuning gap 415. In this case, all of the data included in the slots 405 of the transmission or retransmission may still be transmitted to the base station.

The retuning gap 415 may be configured (e.g., by the base station) with signaling in a symbol of a reserved control region or a symbol without a demodulation reference signal before or after the frequency hopping. Additionally or alternatively, the UE may determine a configuration for the retuning gap based on a preconfigured or predefined configuration. In some cases, the UE may determine to perform the retuning operation during the retuning gap 415-a due to a front-loaded demodulation reference signal within the slots 405 of the retransmission. For example, the demodulation reference signal may be transmitted within the slot 405-e and performing the retuning operation within the retuning gap 415-b may block the transmitting the demodulation reference signal, which may enable a base station receiver to perform channel estimation. In some other cases, the UE may determine to perform the retuning operation during the retuning gap 415-b. Here, the retuning gap 415-b may include a first number of symbols within the slot 405-e reserved for downlink control signal transmission. The UE may not monitor the control signaling during the retuning gap 415-b. For example, the base station may not transmit the control signaling of scheduling information to the UE. In some other cases, the UE may determine to perform the retuning operation during the retuning gap 415-a and 415-b to balance an impact on the transmission in slot 405-d and slot 405-e (e.g., due to uplink retuning).

FIGS. 5A-5B illustrate examples of frequency hopping patterns 500 that support frequency hopping with slot bundling in accordance with various aspects of the present disclosure. The frequency hopping patterns 500 may be examples of any of the frequency hopping patterns as described with reference to FIG. 3A-FIG. 4. Further, the frequency hopping patterns 500 may be implemented by wireless communications systems 100 and 200. For example, a UE (e.g., as described with reference to FIGS. 1 and 2) may transmit uplink transmissions to a base station (e.g., as described with reference to FIGS. 1 and 2) according to the frequency hopping pattern 500. Each of the frequency hopping patterns 500 may illustrate a frequency hopping pattern where a bandwidth part 530 associated with the retransmission is wider than a bandwidth part 530 associated with the transmission.

FIG. 5A illustrates a frequency hopping pattern 500-a. Here, the bandwidth part 530-a may be relatively smaller than the bandwidth part 530-b. The hopping pattern 500-a may include the transmission within the bandwidth part 530-a and the retransmission within the bandwidth part 530-b. In one example, when a UE hops to a wider bandwidth part 530-b, the retransmission may span a same frequency range 510-b and have a same starting resource block as the transmission. For example, the frequency ranges 510-b and 510-a may be the same and the resource block offsets 525-a and 525-b may also be the same. Further, both the transmission and the retransmission may span the same number of slots. For example, the transmission may include two slots 505-a and 505-b while the retransmission also includes two slots 505-c and 505-d.

FIG. 5B illustrates a frequency hopping pattern 500-b. Here, the bandwidth part 530-c may be relatively smaller than the bandwidth part 530-d. The hopping pattern 500-b may include the transmission within the bandwidth part 530-a and the retransmission within the bandwidth part 530-b. In one example, when a UE hops to a wider bandwidth part 530-d, the retransmission may span a larger frequency range 510-d while having a same starting resource block as the transmission. For example, the frequency range 510-d may be greater than the frequency range 510-c, and the resource block offsets 525-c and 525-d may be the same. In this example, the number of slots 505 may change between the transmission and the retransmission. For example, the transmission may include two slots 505-e and 505-f while the retransmission may include only one slot 505-g. By increasing the frequency range 510-d of the retransmission and decreasing the number of slots 505, the UE may communicate a same amount of data within the transmission and retransmission. In some cases the frequency range 510-d may be scaled according to a difference in widths of the bandwidth part 530-c and the bandwidth part 530-d. For example, if the bandwidth part 530-d is twice the width of the bandwidth part 530-c, then the frequency range 510-d may also be twice the width of the frequency range 510-c.

In some examples (e.g., when a UE is frequency hopping within a single bandwidth part), the frequency range 510 of the transmission and retransmission may change. For example, similar to frequency hopping pattern 500-b, the UE may have a larger frequency range 510 and a smaller number of slots 505 for the retransmission when compared to the transmission.

FIGS. 6A-6B illustrate example frequency hopping patterns 600 that support frequency hopping with slot bundling in accordance with various aspects of the present disclosure. The frequency hopping patterns 600 may be examples of any of the frequency hopping patterns as described with reference to FIG. 3A-FIG. 4. Further, the frequency hopping patterns 600 may be implemented by wireless communications systems 100 and 200. For example, a UE (e.g., as described with reference to FIGS. 1 and 2) may transmit uplink transmissions to a base station (e.g., as described with reference to FIGS. 1 and 2) according to the frequency hopping pattern 600. Each of the frequency hopping patterns 600 may illustrate a frequency hopping pattern where a bandwidth part 630 associated with the retransmission is narrower than a bandwidth part 630 associated with the transmission.

FIG. 6A may illustrate a frequency hopping pattern 600-a. Here, the bandwidth part 630-a may be relatively larger than the bandwidth part 630-b. The hopping pattern 600-a may include the transmission within the bandwidth part 630-a and the retransmission within the bandwidth part 630-b. In one example, a UE hops to a narrower bandwidth part 630-b to a same relative resource block within the narrower bandwidth part 630-b. That is, the resource block offset 625-a and 625-b are the same. The UE may drop any portion of the frequency range 610-b that extends outside of the bandwidth part 630-b. For example, if portion 615-a extends outside of the bandwidth part 630-b in slot 605-c and portion 615-b extends outside of the bandwidth part 630-b in slot 605-d, the UE may drop the resource blocks within the portions 615-a and 615-b and only transmit the portions of the retransmission that fall within the bandwidth part 630-b. Here, both the transmission and retransmission may span a same number of slots 605. Further, in a case that an entire frequency range 610-b is within the bandwidth part 630-b, the frequency ranges 610-a and 610-b may be the same.

In some examples (e.g., when a UE is frequency hopping within a single bandwidth part), the frequency range 610 of the transmission and retransmission may change. For example, similar to frequency hopping pattern 600-a, the UE may hop to a smaller frequency range 610-b for a retransmission. Here, any of the resource blocks that are outside of the frequency range 610-b for the retransmission may be dropped.

FIG. 6B may illustrate a frequency hopping pattern 600-b. Here, the bandwidth part 630-c may be relatively larger than the bandwidth part 630-d. The hopping pattern 600-b may include the transmission within the bandwidth part 630-a and the retransmission within the bandwidth part 630-b. In one example when a UE hops to a narrower bandwidth part 630-d, the retransmission may span a smaller frequency range 610-d while having a same starting resource block as the transmission. For example, the frequency range 610-d may be less than the frequency range 610-c, and the resource block offsets 625-c and 625-d may be the same. In this example, the number of slots 605 may change between the transmission and the retransmission. For example, the transmission may include two slots 605-e and 605-f while the retransmission may include four slots 605-g, 605-h, 605-i, and 605-j. By decreasing the frequency range 610-d of the retransmission and increasing the number of slots 605, the UE may communicate a same amount of data within the transmission and retransmission. In some cases the frequency range 610-d may be scaled according to a difference in widths of the bandwidth part 630-c and the bandwidth part 630-d. For example, if the bandwidth part 630-d is half the width of the bandwidth part 630-c, then the frequency range 610-d may also be half the width of the frequency range 610-c.

In some examples (e.g., when a UE is frequency hopping within a single bandwidth part), the frequency range 610-d of a retransmission may be narrower than the frequency range 610-c of the transmission. In some examples, similar to frequency hopping pattern 600-b, the UE may have a narrower frequency range 610 and a larger number of slots 605 for the retransmission when compared to the transmission.

Figure 7A:
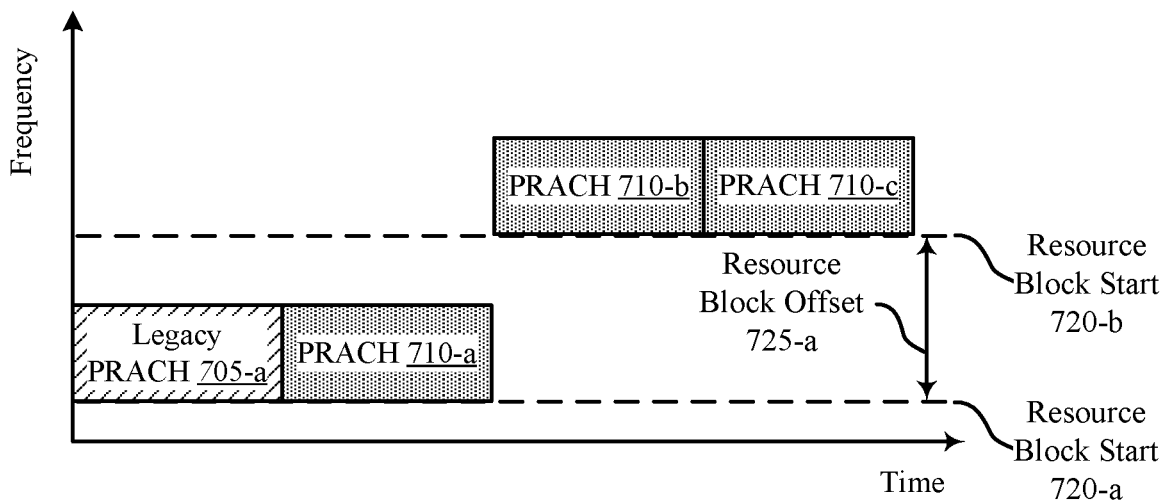
Figure 7B:
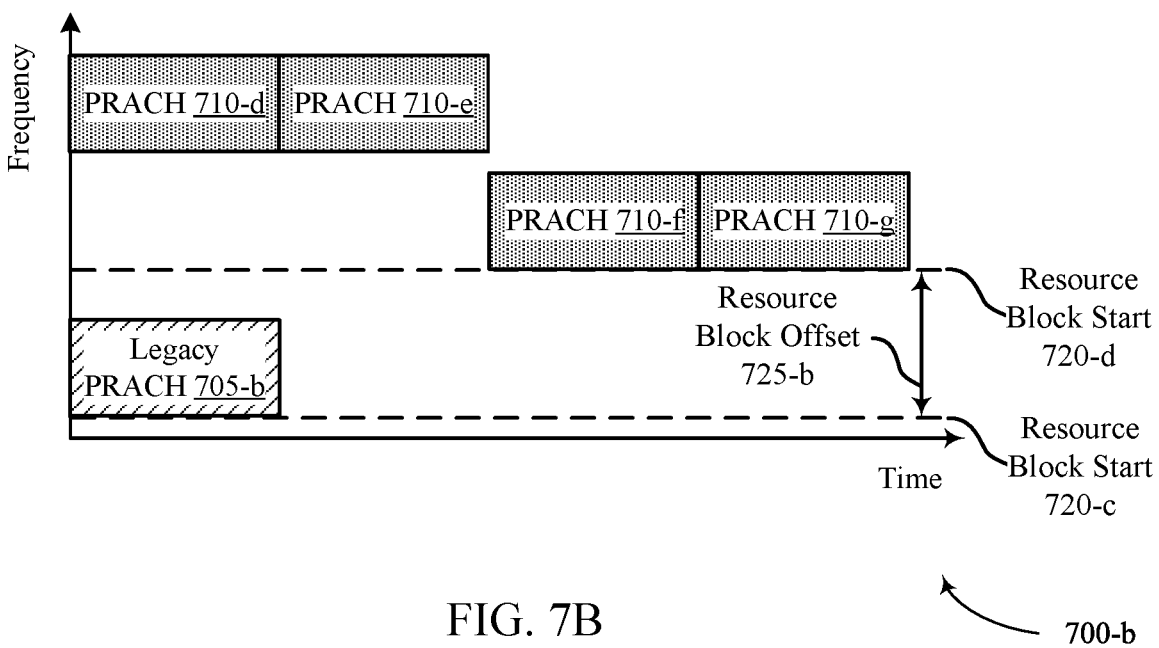

FIG. 7A-7B illustrate example frequency hopping patterns 700 that support frequency hopping with slot bundling in accordance with various aspects of the present disclosure. The frequency hopping patterns 700 may be examples of any of the frequency hopping patterns as described with reference to FIG. 3A-FIG. 6. Further, the frequency hopping patterns 700 may be implemented by wireless communications systems 100 and 200. For example, a UE (e.g., as described with reference to FIGS. 1 and 2) may transmit uplink transmissions to a base station (e.g., as described with reference to FIGS. 1 and 2) according to the frequency hopping pattern 700. The frequency hopping patterns 700 may illustrate frequency hopping patterns for PRACH transmissions. The legacy PRACH occasions 705 and the PRACH occasions 710 may each span one or more slots.

A UE may be configured with a default or legacy PRACH transmission occasion 705 (e.g., a default PRACH occasion). In some cases a UE may determine to utilize a frequency hopping scheme in order to improve a frequency diversity associated with the PRACH transmissions. That is, the UE (e.g., an NR-Light UE) may be in a poor coverage area and a frequency hopping pattern 700 may increase reliability of the PRACH transmissions. For example, if an RSRP falls below a threshold, the UE may determine to utilize a frequency hopping pattern 700 for PRACH transmissions. The threshold may be defined or preconfigured or, in some cases, signaled to the UE by a base station (e.g., by a SIB).

FIG. 7A illustrates a frequency hopping pattern 700-*a*. Here, the frequency hopping pattern 700-*a* for transmitting PRACH by PRACH occasions 705 and 710 may include the legacy PRACH occasion 705-*a*. In some cases, the legacy PRACH occasion 705-*a* may be a slot configured for PRACH transmissions for UEs with limited transmission capabilities (e.g., an NR-Light UE or a defined UE type with reduced capability or complexity) as well as for UEs with standard transmission power capabilities.

Frequency hopping pattern 700-*a* may include a first PRACH transmission (e.g., including a PRACH transmission over the legacy PRACH occasion 705-*a* and the PRACH occasion 710-*a*) and a retransmission of the PRACH transmission over PRACH occasions 710-*b* and 710-*c*. In some cases, the PRACH transmission (e.g., over the legacy PRACH occasion 705-*a* and the PRACH occasion 710-*a*) may be in a same bandwidth part as the PRACH retransmission (e.g., over the PRACH occasions 710-*b* and 710-*c*). In this example, the frequency hopping pattern 700-*a* may be an intra-bandwidth part frequency hopping pattern 700-*a*. In some other cases, the PRACH transmission (e.g., over the legacy PRACH occasion 705-*a* and the PRACH occasion 710-*a*) may be in a different bandwidth part as the PRACH retransmission (e.g., over the PRACH occasions 710-*b* and 710-*c*). In this example, the frequency hopping pattern 700-*a* may be an inter-bandwidth part frequency hopping pattern 700-*a*. During the inter-bandwidth part frequency hopping for the PRACH transmission, the UE may perform a retuning operation. In some cases, a gap at the end of the PRACH occasion 710-*a* (e.g., a PRACH gap) may be used by the UE to perform the retuning operation. Additionally or alternatively, the UE may perform the retuning operation in a portion of the retuning operation within the gap at the end of the PRACH occasion 710-*a* (e.g., in a case that the gap is smaller than a time for performing a retuning operation).

FIG. 7B illustrates a frequency hopping pattern 700-*b*. Here, the frequency hopping pattern 700-*b* for transmitting PRACH by PRACH occasions 705 and 710 may not include the legacy PRACH occasion 705-*b*. In some cases, the legacy PRACH occasion 705-*b* may be a slot configured for PRACH transmissions for UEs with standard transmission power capabilities. That is, the legacy PRACH occasion 705-*b* may not be configured for a UE with a limited transmission power capability (e.g., an NR-Light UE, an MTC UE). The PRACH configuration for a UE with a limited transmission power capability (e.g., the PRACH format, PRACH repetition number) may be independent from a PRACH configuration for a UE with standard transmission power capabilities.

Frequency hopping pattern 700-*b* may include a first PRACH transmission over the PRACH occasions 710-*d* and 710-*e* and a retransmission of the PRACH transmission over PRACH occasions 710-*f* and 710-*g*. In some cases, the PRACH transmission (e.g., over the PRACH occasions 710-*d* and 710-*e*) may be in a same bandwidth part as the PRACH retransmission (e.g., over the PRACH occasions 710-*f* and 710-*g*). In this example, the frequency hopping pattern 700-*b* may be an intra-bandwidth part frequency hopping pattern 700-*b*. In some other cases, the PRACH transmission (e.g., over the PRACH occasions 710-*d* and 710-*e*) may be in a different bandwidth part as the PRACH retransmission (e.g., over the PRACH occasions 710-*f* and 710-*g*). In this example, the frequency hopping pattern 700-*b* may be an inter-bandwidth part frequency hopping pattern 700-*b*. During the inter-bandwidth part frequency hopping for the PRACH transmission, the UE may perform a retuning operation. In some cases, a gap at the end of the PRACH occasion 710-*b* may be used by the UE to perform the retuning operation.

Figure 8:
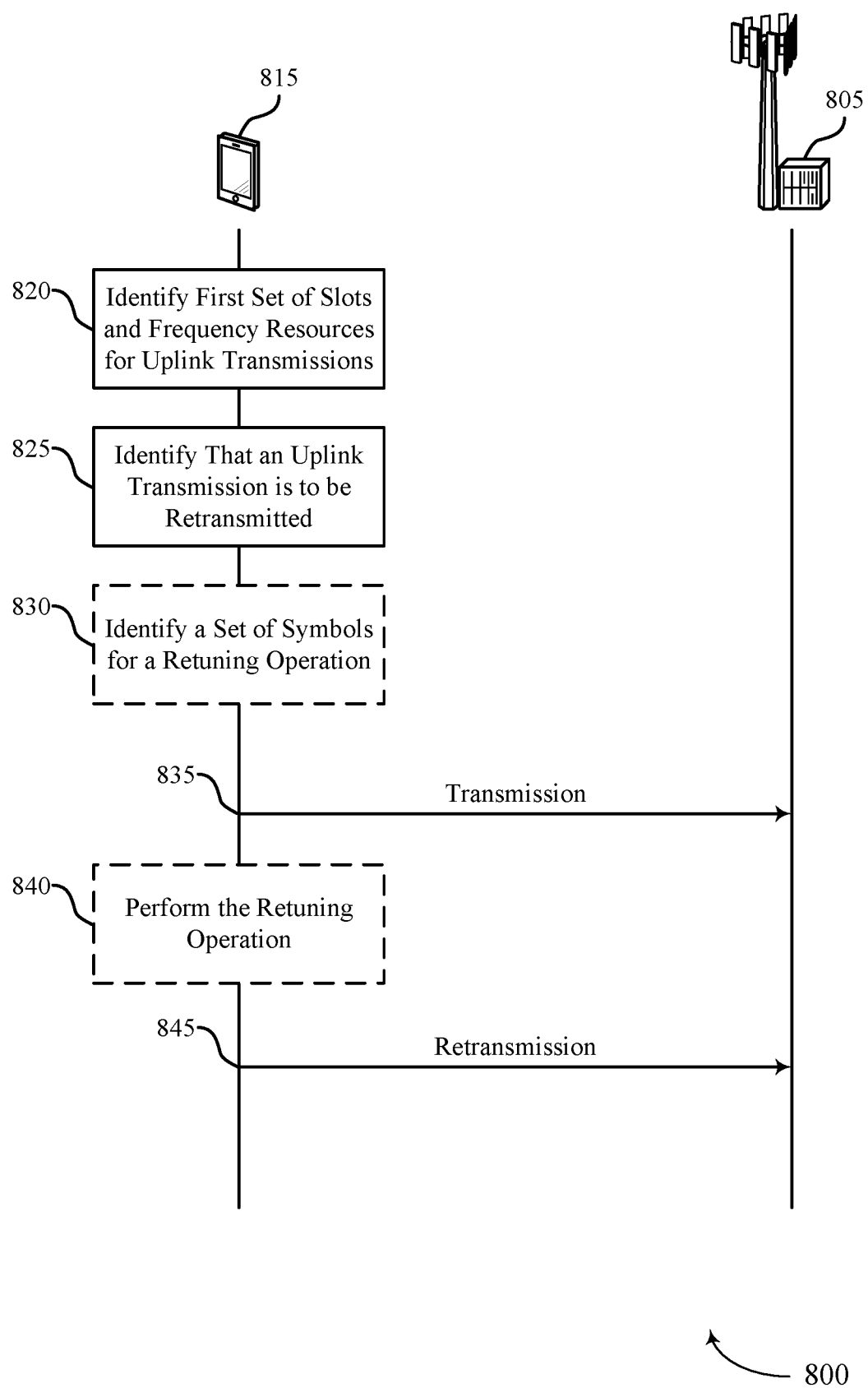
FIG. 8 illustrates an example of a process flow that supports frequency hopping with slot bundling in accordance with aspects of the present disclosure.

FIG. 8 illustrates an example of a process flow 800 that supports frequency hopping with slot bundling in accordance with various aspects of the present disclosure. The process flow 800 may support aspects of the wireless communications system 100 and 200, as described with reference to FIGS. 1 and 2. For example, the process flow 800 may include communications between a base station 805 or a UE 815, which may be examples of base stations and UEs, respectively, as described with reference to FIGS. 1 and 2. In the following description of the process flow 800, the operations performed by the base station 805 and the UE 815 may be performed in different orders or at different times. Some operations may also be omitted from the process flow 800, and other operations may be added to the process flow 800.

At 820, the UE 815 may identify that one or more uplink transmissions are to be transmitted by the UE 815 during a first set of slots and within a first set of frequency resources.

At 825, the UE 815 may identify that the one or more uplink transmissions are to be retransmitted during a second set of slots and within a second set of frequency resources that are different from the first set of frequency resources in accordance with a frequency hopping pattern. The frequency hopping pattern may provide for intra-bandwidth part frequency hopping, inter-bandwidth frequency hopping, or both. In some cases, the first set of slots and the second set of slots each include two or more slots.

The UE 815 may identify the second set of slots and the second set of frequency resources based on identifying a resource block offset indicating a number of resource blocks between a first resource block of the first set of frequency resources and a first resource block of the second set of frequency resources. In some other cases, identifying the second set of slots and the second set of frequency resources may be based on determining more than one bandwidth part configuration and receiving an indication of the frequency hopping pattern that includes an index list selecting the first bandwidth part configuration and the second bandwidth part configuration or an indication of an offset of a second bandwidth part configuration index relative to a first bandwidth part configuration index. In some other cases, the UE 15 may identify the second set of slots and the second set of frequency resources based on a first bandwidth of the first set of frequency resources and a second center frequency indicated by the frequency hopping pattern.

At 830, the UE 815 may optionally identify a set of symbols for performing a retuning operation prior to a retransmission of the one or more uplink transmissions. In some cases, the UE 815 may identify a set of symbols for performing the retuning operation in a case that the first set of frequency resources and the second set of frequency resources are in different bandwidth parts. In some cases, the UE 815 may identify the set of symbols at an end of a last slot of the first set of frequency resources. Alternatively, the UE 815 may identify the set of symbols at a beginning of a first slot of the second set of frequency resources.

At 835, the UE 815 may transmit the one or more uplink transmissions during the first set of slots and within the first set of frequency resources.

At 840, the UE 815 may optionally perform a retuning operation. The UE may perform the retuning operation during the set of symbols (e.g., identified at 830).

At 845, the UE 815 may transmit the uplink retransmissions during the second set of slots and within the second set of frequency resources that are different from the first set of frequency resources.

Figure 9:
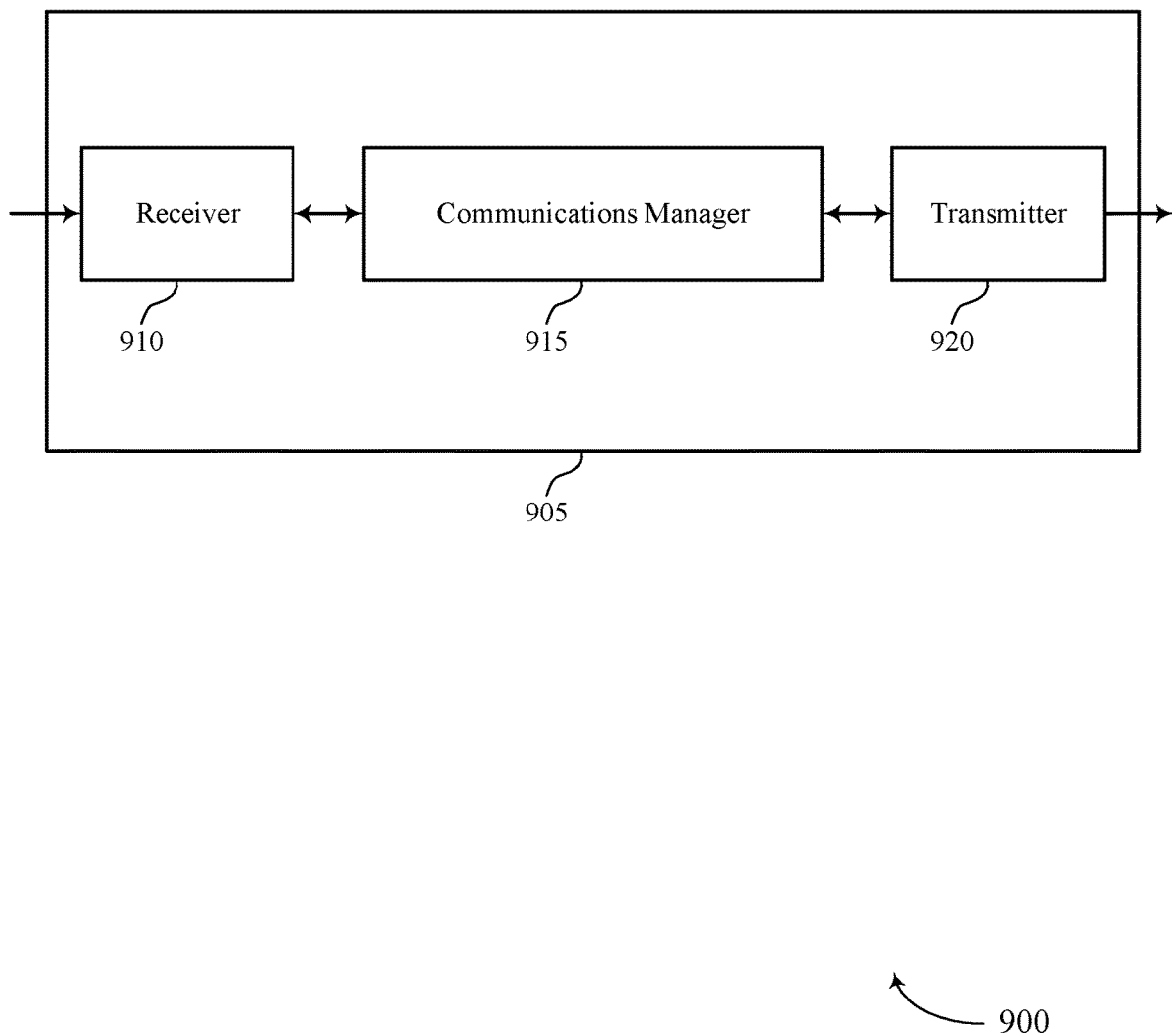
FIGS. 9 and 10 show block diagrams of devices that support frequency hopping with slot bundling in accordance with aspects of the present disclosure.

FIG. 9 shows a block diagram 900 of a device 905 that supports frequency hopping with slot bundling in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to frequency hopping with slot bundling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots, identify a set of symbols at an end of a last slot of the first set of frequency resources for performing a retuning operation prior to a retransmission of the one or more uplink transmissions, and transmit the one or more uplink transmissions in accordance with the frequency hopping pattern and the retuning operation. The communications manager 915 may also identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots, and transmit the one or more uplink transmissions in accordance with the frequency hopping pattern. The communications manager 915 may be an example of aspects of the communications manager 1210 described herein.

The actions performed by the communications manager 915 as described herein may be implemented to realize one or more potential advantages. One implementation may allow a UE 115 to increase reliability by performing a retransmission for uplink communications. In some cases, an implementation may allow a UE 115 to further increase reliability by providing increased frequency diversity for the retransmissions during inter-bandwidth part frequency hopping when compared to intra-bandwidth part frequency hopping. Additionally or alternatively, the UE 115 may further increase efficiency during frequency hopping by transmitting at each frequency for more than one slot, thus decreasing a frequency of performing a retuning operation.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
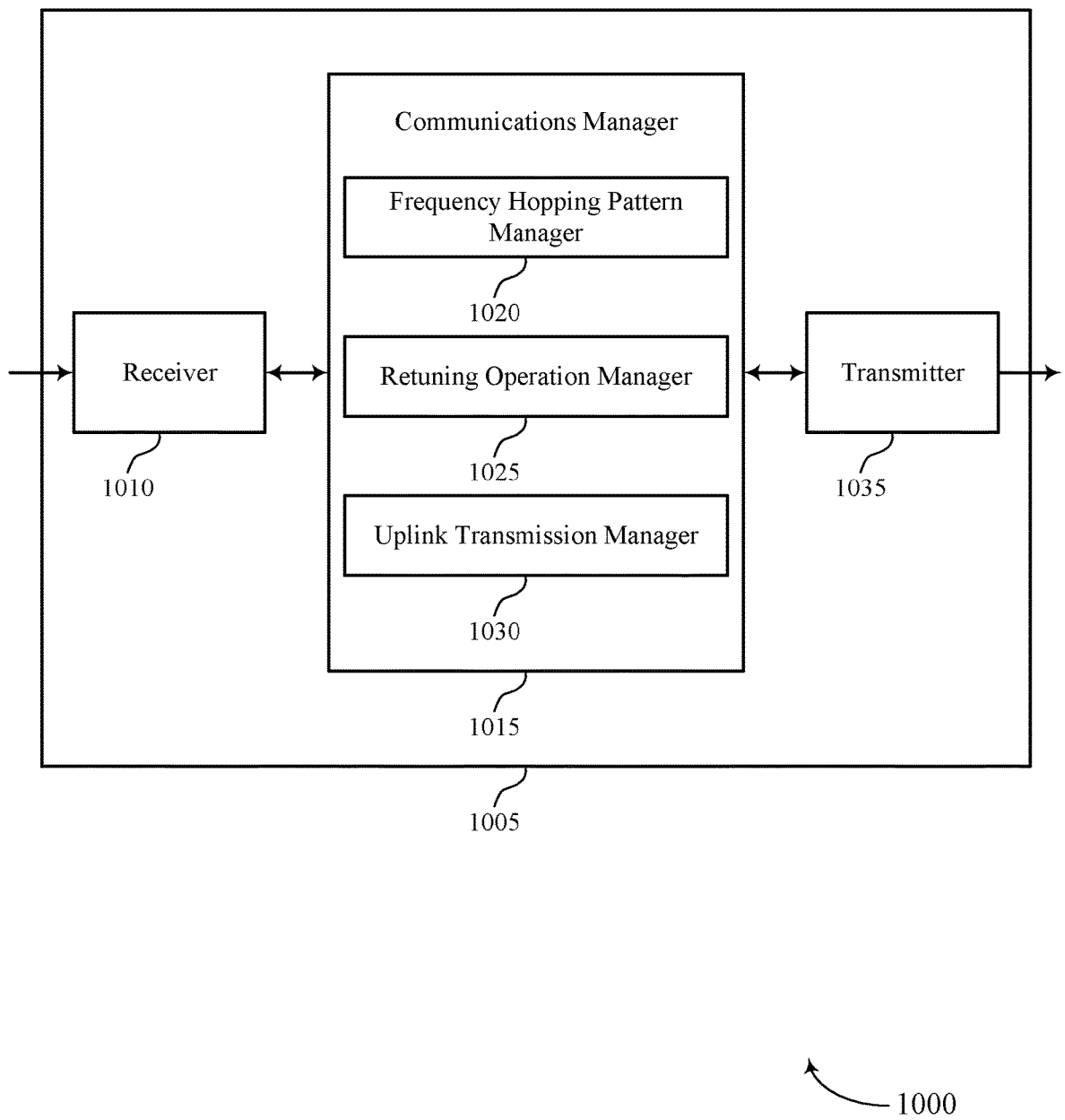

FIG. 10 shows a block diagram 1000 of a device 1005 that supports frequency hopping with slot bundling in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to frequency hopping with slot bundling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a frequency hopping pattern manager 1020, a retuning operation manager 1025, and an uplink transmission manager 1030. The communications manager 1015 may be an example of aspects of the communications manager 1210 described herein.

The frequency hopping pattern manager 1020 may identify that one or more uplink transmissions are to be transmitted by the UE during a first set of slots and within a first set of frequency resources. The frequency hopping pattern manager 1020 may also identify that the one or more uplink transmissions are to be retransmitted during a second set of slots and within a second set of frequency resources that are different from the first set of frequency resources in accordance with a frequency hopping pattern, where the first set of slots and the second set of slots each include two or more slots. The frequency hopping pattern may provide for at least intra-bandwidth part frequency hopping. In some other cases, the frequency hopping pattern may provide for inter-bandwidth part frequency hopping The retuning operation manager 1025 may identify a set of symbols at an end of a last slot of the first set of frequency resources for performing a retuning operation prior to a retransmission of the one or more uplink transmissions.

The uplink transmission manager 1030 may transmit the one or more uplink transmissions in accordance with the frequency hopping pattern and the retuning operation.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
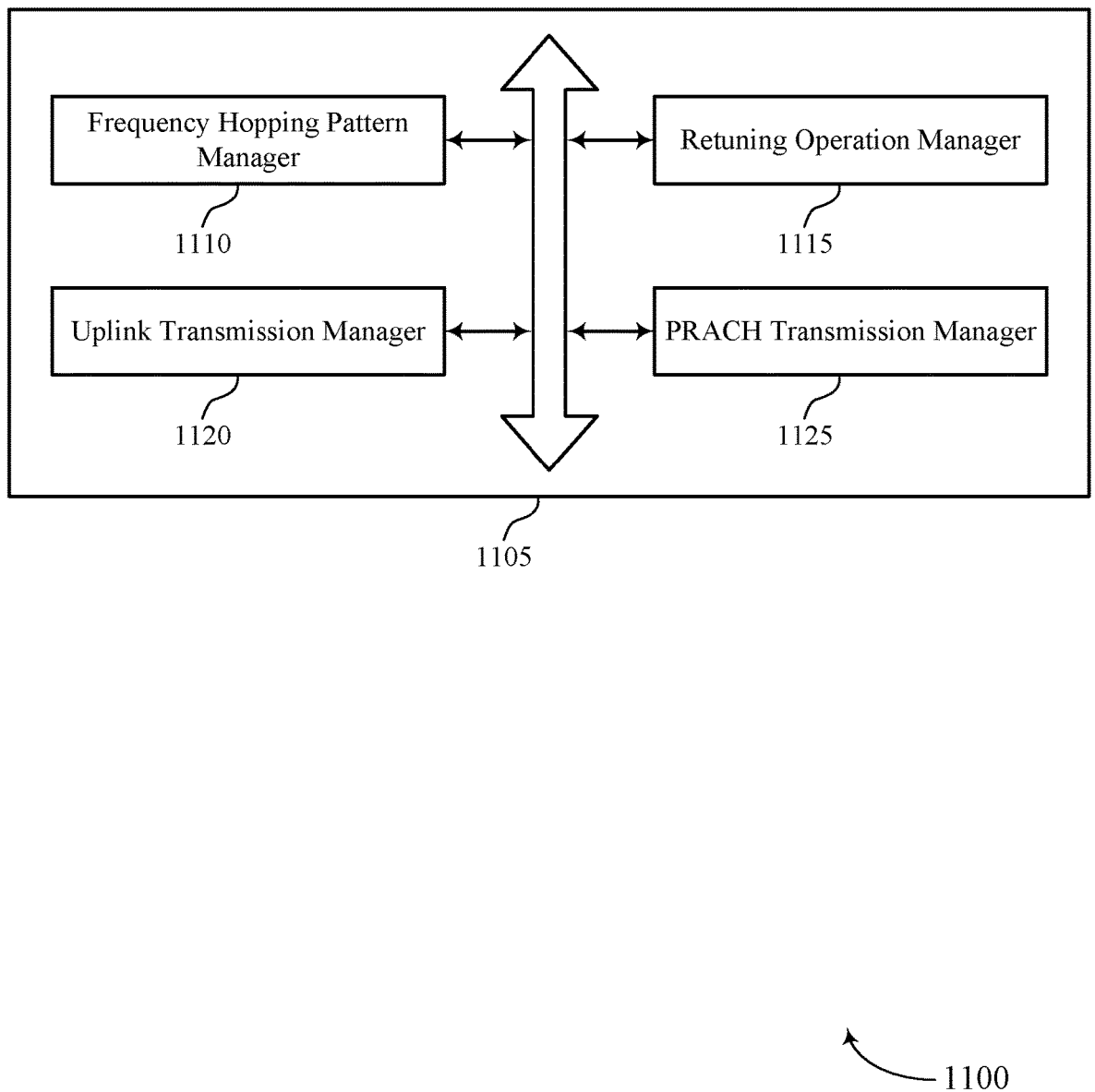
FIG. 11 shows a block diagram of a user equipment (UE) that supports frequency hopping with slot bundling in accordance with aspects of the present disclosure.

FIG. 11 shows a block diagram 1100 of a communications manager 1105 that supports frequency hopping with slot bundling in accordance with aspects of the present disclosure. The communications manager 1105 may be an example of aspects of a communications manager 915, a communications manager 1015, or a communications manager 1210 described herein. The communications manager 1105 may include a frequency hopping pattern manager 1110, a retuning operation manager 1115, an uplink transmission manager 1120, and a PRACH transmission manager 1125. Each of these modules may communicate, directly or indirectly, with one another (e.g., via one or more buses).

The frequency hopping pattern manager 1110 may identify that one or more uplink transmissions are to be transmitted by the UE during a first set of slots and within a first set of frequency resources. In some examples, the frequency hopping pattern manager 1110 may identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots. In some instances, the frequency hopping pattern manager 1110 may identify that one or more uplink transmissions are to be transmitted by the UE during a first set of slots and within a first set of frequency resources.

In some cases, the frequency hopping pattern manager 1110 may identify that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots. In some examples, the frequency hopping pattern manager 1110 may identify a resource block offset indicating a number of resource blocks between a first resource block of the first set of frequency resources and a first resource block of the second set of frequency resources, where identifying that the one or more uplink transmissions are to be retransmitted is based on identifying the resource block offset. In some instances, the frequency hopping pattern manager 1110 may determine, based on the resource block offset, whether a range of the second set of frequency resources exceeds a maximum bandwidth of the UE or is within a maximum bandwidth of the UE.

In some cases, the frequency hopping pattern manager 1110 may determine more than one bandwidth part configuration, where each bandwidth part configuration includes a set of frequency resources and a first bandwidth part configuration includes the first set of frequency resources and a second bandwidth part configuration includes the second set of frequency resources. In some examples, the frequency hopping pattern manager 1110 may receive an indication of the frequency hopping pattern that includes an index list selecting the first and second bandwidth part configurations or an indication of an offset of a second bandwidth part configuration index relative to a first bandwidth part configuration index.

In some instances, the frequency hopping pattern manager 1110 may determine the first set of frequency resources based on a first bandwidth of the first set of frequency resources and a first center frequency of the first bandwidth of the first set of frequency resources. In some cases, the frequency hopping pattern manager 1110 may determine the second set of frequency resources based on the first bandwidth of the first set of frequency resources and a second center frequency indicated by the frequency hopping pattern, where a second bandwidth of the second set of frequency resources equals the first bandwidth of the first set of frequency resources. In some cases, the frequency hopping pattern manager 1110 may determine a position within the first bandwidth part of a starting resource block of the first set of frequency resources.

In some examples, the frequency hopping pattern manager 1110 may determine that a position within the second bandwidth part of a starting resource block of the second set of frequency resources is the same as the position within the first bandwidth part based on the first bandwidth part spanning the same number of resource blocks as the second bandwidth part.

In some examples, the frequency hopping pattern manager 1110 may determine that an uplink transmission within the last slot includes uplink control information.

In some examples, the frequency hopping pattern manager 1110 may determine more than one bandwidth part configuration, where each bandwidth part configuration includes a set of frequency resources and a first bandwidth part configuration includes the first set of frequency resources and a second bandwidth part configuration includes the second set of frequency resources.

In some examples, the frequency hopping pattern manager 1110 may receive an indication of the frequency hopping pattern that includes an index list selecting the first and second bandwidth part configurations or an indication of an offset of a second bandwidth part configuration index relative to a first bandwidth part configuration index.

In some examples, the frequency hopping pattern manager 1110 may determine the first set of frequency resources based on a first bandwidth of the first set of frequency resources and a first center frequency of the first bandwidth of the first set of frequency resources.

In some examples, the frequency hopping pattern manager 1110 may determine the second set of frequency resources based on the first bandwidth of the first set of frequency resources and a second center frequency indicated by the frequency hopping pattern, where a second bandwidth of the second set of frequency resources equals the first bandwidth of the first set of frequency resources.

In some cases, a first number of slots within the first set of slots and a second number of slots within the second set of slots is based on a mobility of the UE, a retuning requirement, a configuration of the one or more uplink transmissions, a reference signal received power, a signal to interference-plus-noise ratio, or a combination thereof. In some instances, a first bandwidth part associated with the first set of frequency resources spans a same number of resource blocks as a second bandwidth part associated with the second set of frequency resources. In some examples, a first bandwidth part associated with the first set of frequency resources spans fewer resource blocks than a second bandwidth part associated with the second set of frequency resources. In some cases, a first bandwidth part associated with the first set of frequency resources spans more resource blocks than a second bandwidth part associated with the second set of frequency resources.

In some cases, the first set of frequency resources spans fewer resource blocks than the second set of frequency resources. In some instances, the first set of slots includes more slots than the second set of slots. In some cases, a first number of slots within the first set of slots and a second number of slots within the second set of slots is based on a mobility of the UE, a retuning requirement, a configuration of the one or more uplink transmissions, a reference signal received power, a signal to interference-plus-noise ratio, or a combination thereof. In some cases, the first set of frequency resources spans a same number of resource blocks as the second set of frequency resources. In some cases, the first set of slots includes more slots than the second set of slots. In some cases, the first set of slots includes fewer slots than the second set of slots.

The retuning operation manager 1115 may identify a set of symbols at an end of a last slot of the first set of frequency resources for performing a retuning operation prior to a retransmission of the one or more uplink transmissions. In some examples, the retuning operation manager 1115 may perform the retuning operation during the set of symbols. In some cases, the retuning operation manager 1115 may transmit, to a base station, an indication of a number of symbols within the set of symbols, where the number of symbols is based on a capability of the UE.

In some examples, the retuning operation manager 1115 may perform a retuning operation during a set of symbols, where the set of symbols is at an end of a last slot of the first set of slots or at the beginning of a first slot of the second set of slots. The retuning operation manager 1115 may determine that a portion of a first slot of the second set of slots is configured to transmit a demodulation reference signal, where the set of symbols is within the last slot of the first set of slots based on the determining. In some cases, the retuning operation manager 1115 may determine that a portion of the first slot of the second set of slots is reserved for control signaling, where the set of symbols is within the portion of the first slot of the second set of slots based on the determining.

In some examples, the retuning operation manager 1115 may transmit, to a base station, an indication of a number of symbols within the set of symbols, where the number of symbols is based on a capability of the UE.

The uplink transmission manager 1120 may transmit the one or more uplink transmissions in accordance with the frequency hopping pattern. In some cases, the uplink transmission manager 1120 may transmit the one or more uplink transmissions in accordance with the frequency hopping pattern and the retuning operation.

In some examples, the uplink transmission manager 1120 may transmit the one or more uplink transmissions during the first set of slots and within the first set of frequency resources. In some instances, the uplink transmission manager 1120 may transmit the retransmission during the second set of slots using a portion of resource blocks of the second set of frequency resources within the maximum bandwidth of the UE, where transmitting the retransmission is based on determining that the range of the second set of frequency resources exceeds the maximum bandwidth of the UE. In some examples, the uplink transmission manager 1120 may transmit the one or more uplink transmissions during the second set of slots and within the second set of frequency resources after performing the retuning operation. In some examples, the uplink transmission manager 1120 may increase a first transmission power of the last slot relative to a second transmission power of a remaining portion of the first set of slots based on determining that the uplink transmission includes uplink control information.

In some examples, the uplink transmission manager 1120 may drop a portion of the one or more uplink transmissions from the second set of frequency resources, where the portion of the one or more uplink transmissions is mapped to resource blocks outside of the second bandwidth part. In some cases, the uplink transmission manager 1120 may drop the retransmission during the second set of slots based on determining that the range of the second set of frequency resources exceeds the maximum bandwidth of the UE.

In some cases, the transmission may be PRACH transmissions. The PRACH transmission manager 1125 may determine that a coverage associated with the UE is below a threshold, where identifying that the one or more uplink transmissions are to be retransmitted is based on determining that the coverage associated with the UE is below the threshold. In some cases, the first set of slots within the first set of frequency resources includes a default PRACH transmission occasion. In some examples, the default PRACH transmission occasion is configured to be used by a first UE with a limited capability or complexity and a second UE with a standard capability or complexity.

In some cases, the first set of slots within the first set of frequency resources and the second set of slots within the second set of frequency resources are different transmission occasions than a default PRACH transmission occasion. In some examples, the UE has a limited power capability and is configured to refrain from transmitting during the default PRACH transmission occasion. In some cases, the default PRACH transmission occasion is configured to be used by a first UE with a limited capability or complexity and a second UE with a standard capability or complexity.

Figure 12:
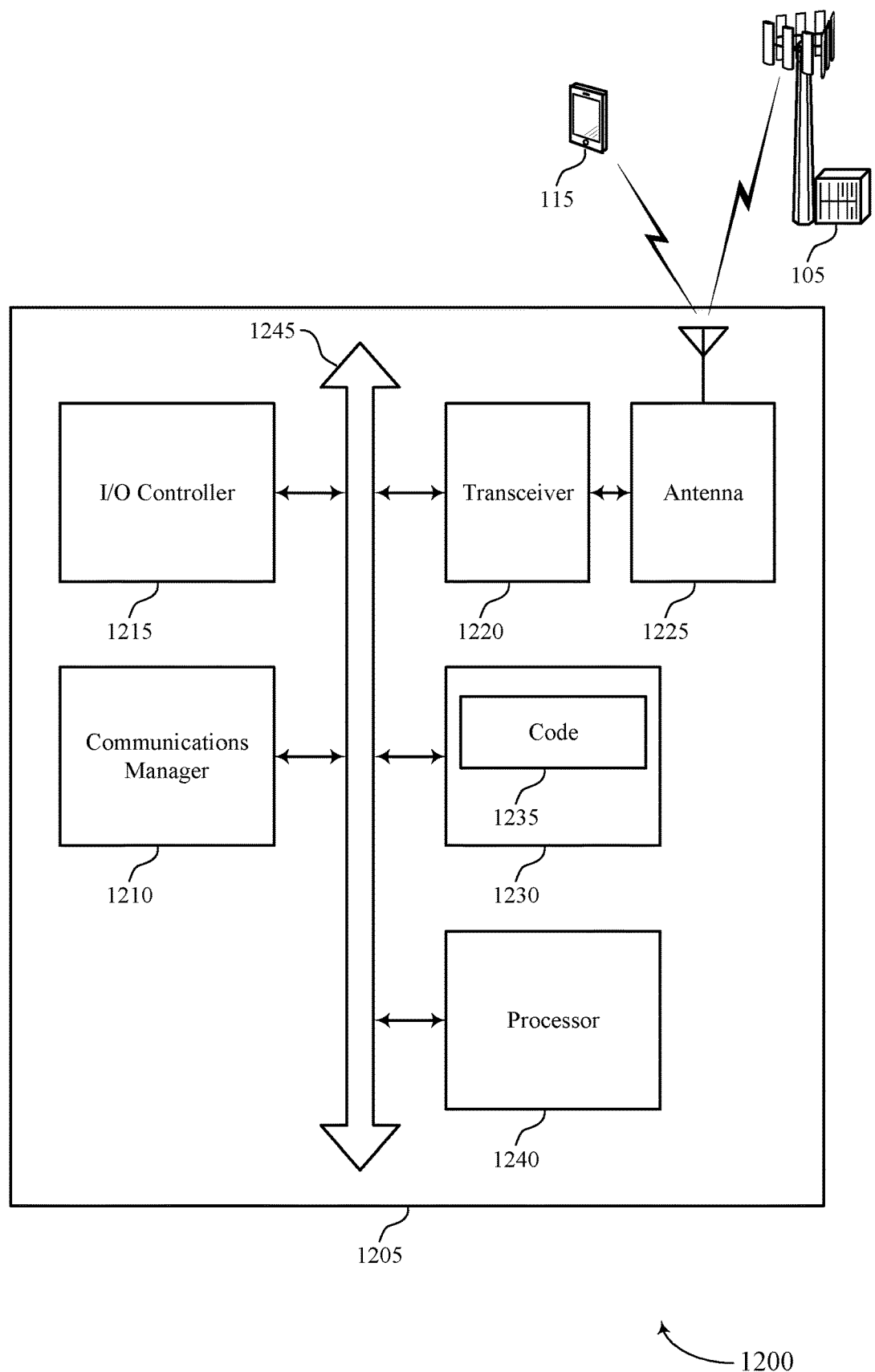
FIG. 12 shows a diagram of a system including a device that supports frequency hopping with slot bundling in accordance with aspects of the present disclosure.

FIG. 12 shows a diagram of a system 1200 including a device 1205 that supports frequency hopping with slot bundling in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots, identify a set of symbols at an end of a last slot of the first set of frequency resources for performing a retuning operation prior to a retransmission of the one or more uplink transmissions, and transmit the one or more uplink transmissions in accordance with the frequency hopping pattern and the retuning operation. The communications manager 1210 may also identify that one or more uplink transmissions are to be transmitted by the UE during a first set of slots and within a first set of frequency resources, identify that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots, and transmit the one or more uplink transmissions in accordance with the frequency hopping pattern.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The processor of a UE 115 (e.g., controlling the transceiver 1220 and antenna 1225) may perform retransmissions based on identifying a frequency hopping pattern. The retransmissions may increase a reliability of the transmissions by providing retransmissions at a different bandwidth than the initial transmission. Additionally, the processor of the UE 115 may transmit over multiple slots between frequency hopping and may thus initiate retuning operations with a lower frequency when compared to frequency hopping that occurs at every slot.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting frequency hopping with slot bundling).

The code 1235 may include instructions to implement aspects of the present disclosure, including instructions to support PREAMBLE. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
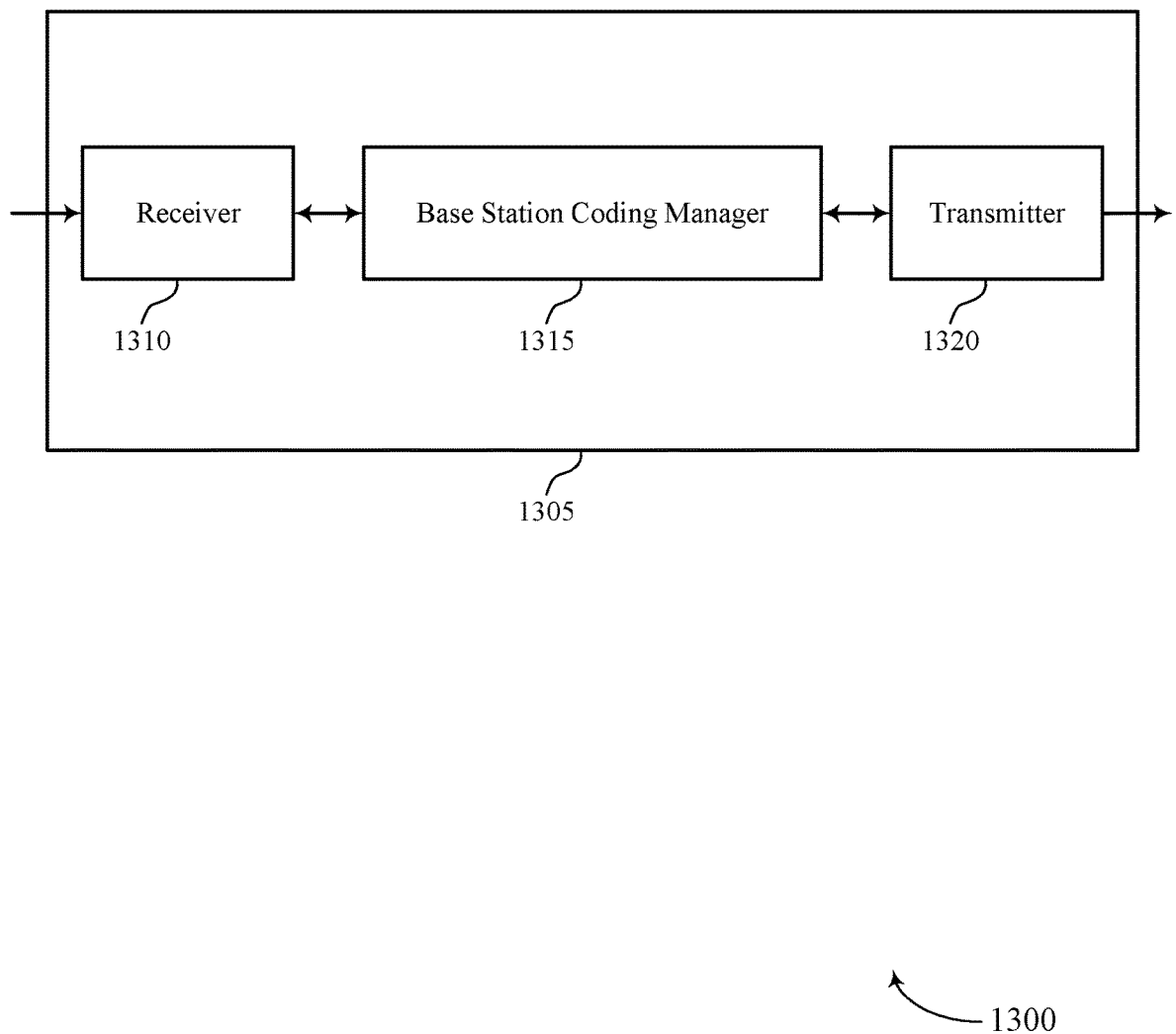
FIGS. 13 and 14 show block diagrams of devices that support frequency hopping with slot bundling in accordance with aspects of the present disclosure.

FIG. 13 shows a block diagram 1300 of a device 1305 that supports frequency hopping with slot bundling in accordance with aspects of the present disclosure. The device 1305 may be an example of aspects of a base station 105 as described herein. The device 1305 may include a receiver 1310, a base station coding manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to frequency hopping with slot bundling, etc.). Information may be passed on to other components of the device 1305. The receiver 1310 may be an example of aspects of the transceiver 1620 described with reference to FIG. 16. The receiver 1310 may utilize a single antenna or a set of antennas.

The base station coding manager 1315 may identify a frequency hopping pattern that provides for at least intra-bandwidth part frequency hopping for uplink communications from a UE, monitor, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots. The base station coding manager 1315 may also identify a frequency hopping pattern that provides for inter-bandwidth part frequency hopping for uplink communications from a UE, monitor, in accordance with the frequency hopping pattern, for one or more uplink transmissions from the UE during a first set of slots and within a first set of frequency resources, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots. The base station coding manager 1315 may be an example of aspects of the base station coding manager 1610 described herein.

The base station coding manager 1315, or its sub-components, may be implemented in hardware, code (e.g., software or firmware) executed by a processor, or any combination thereof. If implemented in code executed by a processor, the functions of the base station coding manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station coding manager 1315, or its sub-components, may be physically located at various positions, including being distributed such that portions of functions are implemented at different physical locations by one or more physical components. In some examples, the base station coding manager 1315, or its sub-components, may be a separate and distinct component in accordance with various aspects of the present disclosure. In some examples, the base station coding manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
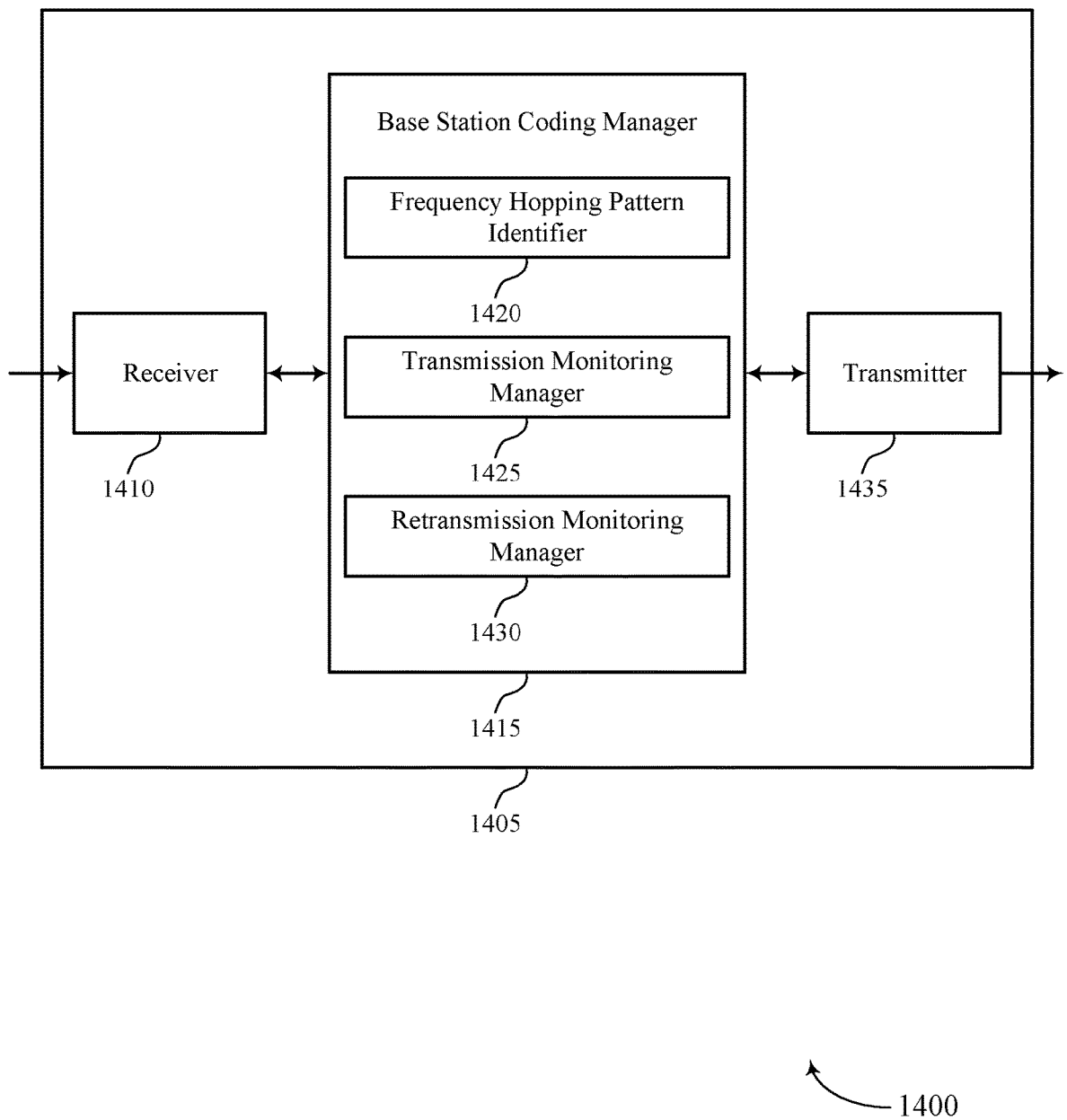

FIG. 14 shows a block diagram 1400 of a device 1405 that supports frequency hopping with slot bundling in accordance with aspects of the present disclosure. The device 1405 may be an example of aspects of a device 1305, or a base station 105 as described herein. The device 1405 may include a receiver 1410, a base station coding manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to frequency hopping with slot bundling, etc.). Information may be passed on to other components of the device 1405. The receiver 1410 may be an example of aspects of the transceiver 1620 described with reference to FIG. 16. The receiver 1410 may utilize a single antenna or a set of antennas.

The base station coding manager 1415 may be an example of aspects of the base station coding manager 1315 as described herein. The base station coding manager 1415 may include a frequency hopping pattern identifier 1420, a transmission monitoring manager 1425, and a retransmission monitoring manager 1430. The base station coding manager 1415 may be an example of aspects of the base station coding manager 1610 described herein.

The frequency hopping pattern identifier 1420 may identify a frequency hopping pattern that provides for at least intra-bandwidth part frequency hopping for uplink communications from a UE. In some other cases, the frequency hopping pattern identifier 1420 may identify a frequency hopping pattern that provides for inter-bandwidth part frequency hopping for uplink communications from a UE.

The transmission monitoring manager 1425 may monitor, in accordance with the frequency hopping pattern, for one or more uplink transmissions transmitted by the UE to the base station during a first set of slots and within a first set of frequency resources. In some cases, a last slot of the first set of slots includes a set of symbols at an end of the last slot associated with a retuning operation at the UE.

The retransmission monitoring manager 1430 may monitor for retransmissions of the one or more uplink transmissions during a second set of slots and within a second set of frequency resources that are different from the first set of frequency resources in accordance with the frequency hopping pattern, where the first set of slots and the second set of slots each include two or more slots.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
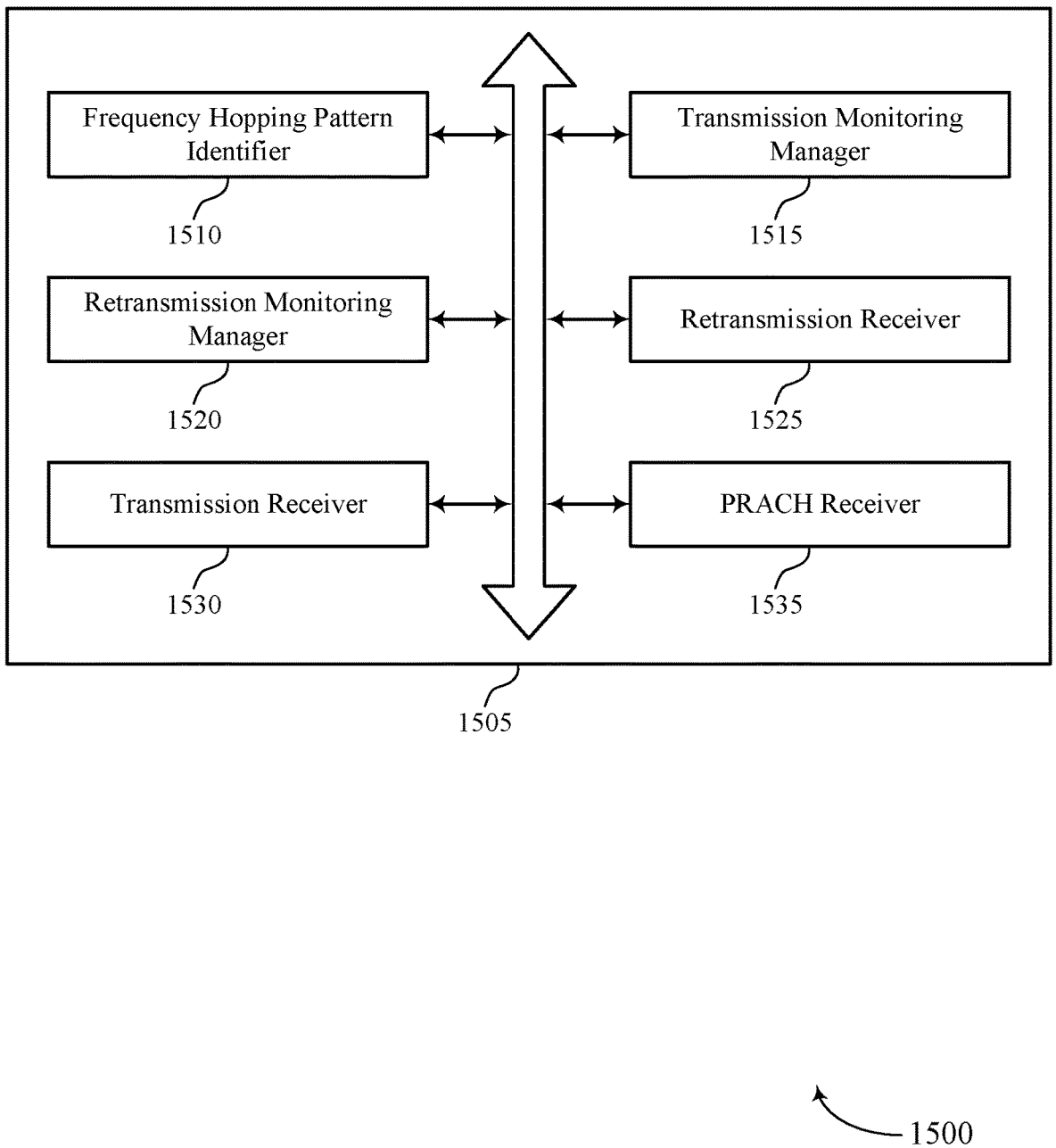
FIG. 15 shows a block diagram of a base station that supports frequency hopping with slot bundling in accordance with aspects of the present disclosure.

FIG. 15 shows a block diagram 1500 of a base station coding manager 1505 that supports frequency hopping with slot bundling in accordance with aspects of the present disclosure. The base station coding manager 1505 may be an example of aspects of a base station coding manager 1315, a base station coding manager 1415, or a base station coding manager 1610 described herein. The base station coding manager 1505 may include a frequency hopping pattern identifier 1510, a transmission monitoring manager 1515, a retransmission monitoring manager 1520, a retransmission receiver 1525, a transmission receiver 1530, and a PRACH receiver 1535. Each of these modules may communicate, directly or indirectly, with one another (e.g., via one or more buses).

The frequency hopping pattern identifier 1510 may identify a frequency hopping pattern that provides for at least intra-bandwidth part frequency hopping for uplink communications from a UE. In some other examples, the frequency hopping pattern identifier 1510 may identify a frequency hopping pattern that provides for inter-bandwidth part frequency hopping for uplink communications from a UE. In some examples, the frequency hopping pattern identifier 1510 may identify a resource block offset indicating a number of resource blocks between a first resource block of the first set of frequency resources and a first resource block of the second set of frequency resources, where identifying that the one or more uplink transmissions are to be retransmitted is based on identifying the resource block offset.

In some examples, the frequency hopping pattern identifier 1510 may determine more than one bandwidth part configuration, where each bandwidth part configuration includes a set of frequency resources and a first bandwidth part configuration includes the first set of frequency resources and a second bandwidth part configuration includes the second set of frequency resources. The frequency hopping pattern identifier 1510 may transmit an indication of the frequency hopping pattern that includes an index list selecting the first and second bandwidth part configurations or an indication of an offset of a second bandwidth part configuration index relative to a first bandwidth part configuration index.

In some cases, the frequency hopping pattern identifier 1510 may determine the first set of frequency resources based on a first bandwidth of the first set of frequency resources and a first center frequency of the first bandwidth of the first set of frequency resources. In some examples, the frequency hopping pattern identifier 1510 may determine the second set of frequency resources based on the first bandwidth of the first set of frequency resources and a second center frequency indicated by the frequency hopping pattern, where a second bandwidth of the second set of frequency resources equals the first bandwidth of the first set of frequency resources.

In some instances, the frequency hopping pattern identifier 1510 may determine a position within the first bandwidth part of a starting resource block of the first set of frequency resources. In some cases, the frequency hopping pattern identifier 1510 may determine that a position within the second bandwidth part of a starting resource block of the second set of frequency resources is the same as the position within the first bandwidth part based on the first bandwidth part spanning the same number of resource blocks as the second bandwidth part.

In some instances, a first number of slots within the first set of slots and a second number of slots within the second set of slots is based on a mobility of the UE, a retuning requirement, a configuration of the one or more uplink transmissions, a reference signal received power, a signal to interference-plus-noise ratio, or a combination thereof. In some examples, a first bandwidth part associated with the first set of frequency resources spans a same number of resource blocks as a second bandwidth part associated with the second set of frequency resources. In some other examples, a first bandwidth part associated with the first set of frequency resources spans fewer resource blocks than a second bandwidth part associated with the second set of frequency resources. In some cases, a first bandwidth part associated with the first set of frequency resources spans more resource blocks than a second bandwidth part associated with the second set of frequency resources.

In some cases, the first set of frequency resources spans fewer resource blocks than the second set of frequency resources. In some other cases, the first set of frequency resources spans more resource blocks than the second set of frequency resources. In some other cases, the first set of frequency resources spans a same number of resource blocks as the second set of frequency resources. In some instances, the first set of slots includes more slots than the second set of slots. In some other instances, the first set of slots includes fewer slots than the second set of slots. In some cases, a range of the second set of frequency resources exceeds a maximum bandwidth of the UE.

The transmission monitoring manager 1515 may monitor, in accordance with the frequency hopping pattern, for one or more uplink transmissions transmitted by the UE to the base station during a first set of slots and within a first set of frequency resources. In some cases, a last slot of the first set of slots includes a set of symbols at an end of the last slot associated with a retuning operation at the UE.

The retransmission monitoring manager 1520 may monitor for retransmissions of the one or more uplink transmissions during a second set of slots and within a second set of frequency resources that are different from the first set of frequency resources in accordance with the frequency hopping pattern, where the first set of slots and the second set of slots each include two or more slots. In some examples, the retransmission monitoring manager 1520 may fail to receive a retransmission of the one or more uplink transmissions during the second set of slots based on the range of the second set of frequency resources exceeding the maximum bandwidth of the UE.

The retransmission receiver 1525 may receive a retransmission of the one or more uplink transmissions within a portion of resource blocks of the second set of frequency resources within the maximum bandwidth of the UE, where receiving the retransmission within the portion of resource blocks is based on the range of the second set of frequency resources exceeding the maximum bandwidth of the UE. In some examples, the retransmission receiver 1525 may receive the retransmission of one or more uplink transmissions, where a portion of the one or more uplink transmissions is dropped from the second set of frequency resources, and where the portion of the one or more uplink transmissions is mapped to resource blocks outside of the second bandwidth part.

In some cases, the retransmission receiver 1525 may receive the one or more uplink transmissions during the second set of slots and within the second set of frequency resources based on monitoring for retransmissions, where receiving the one or more uplink transmissions during the second set of slots occurs after the UE performs the retuning operation during the set of symbols within the last slot of the first set of slots. In some examples, the retransmission receiver 1525 may receive, from the UE, an indication of a number of symbols within the set of symbols, where the number of symbols is based on a capability of the UE. In some examples, the retransmission receiver 1525 may receive the one or more uplink transmissions during the second set of slots and within the second set of frequency resources based on monitoring for retransmissions, where receiving the one or more uplink transmissions during the second set of slots occurs after the UE performs a retuning operation during a set of symbols at an end of a last slot of the first set of slots or at the beginning of a first slot of the second set of slots.

In some cases, a portion of a first slot of the second set of slots is configured to transmit a demodulation reference signal. In some instances, the set of symbols is at the end of the last slot of the first set of slots based on the portion of the first slot being configured to transmit the demodulation reference signal. In some examples, a portion of the first slot of the second set of slots is reserved for control signaling. In some cases, the set of symbols is within the portion of the first slot of the second set of slots based on the portion of the first slot being reserved for control signaling.

The transmission receiver 1530 may receive the one or more uplink transmissions during the first set of slots and within the first set of frequency resources based on monitoring for one or more uplink transmissions during the first set of slots and within the first set of frequency resources. In some cases, the set of symbols is at the end of the last slot of the first set of slots based on the portion of the first slot being configured to transmit the demodulation reference signal.

In some cases, the one or more uplink transmissions may be PRACH transmissions. The PRACH receiver 1535 may determine that a coverage associated with the UE is below a threshold, where monitoring for retransmissions is based on determining that the coverage associated with the UE is below the threshold. In some cases, the first set of slots within the first set of frequency resources includes a default PRACH transmission occasion. In some instances, the default PRACH transmission occasion is configured to be used by a first UE with a limited capability or complexity and a second UE with a standard capability or complexity. In some examples, the first set of slots within the first set of frequency resources and the second set of slots within the second set of frequency resources are different transmission occasions than a default PRACH transmission occasion. The UE may have a limited power capability and may be configured to refrain from transmitting during the default PRACH transmission occasion.

Figure 16:
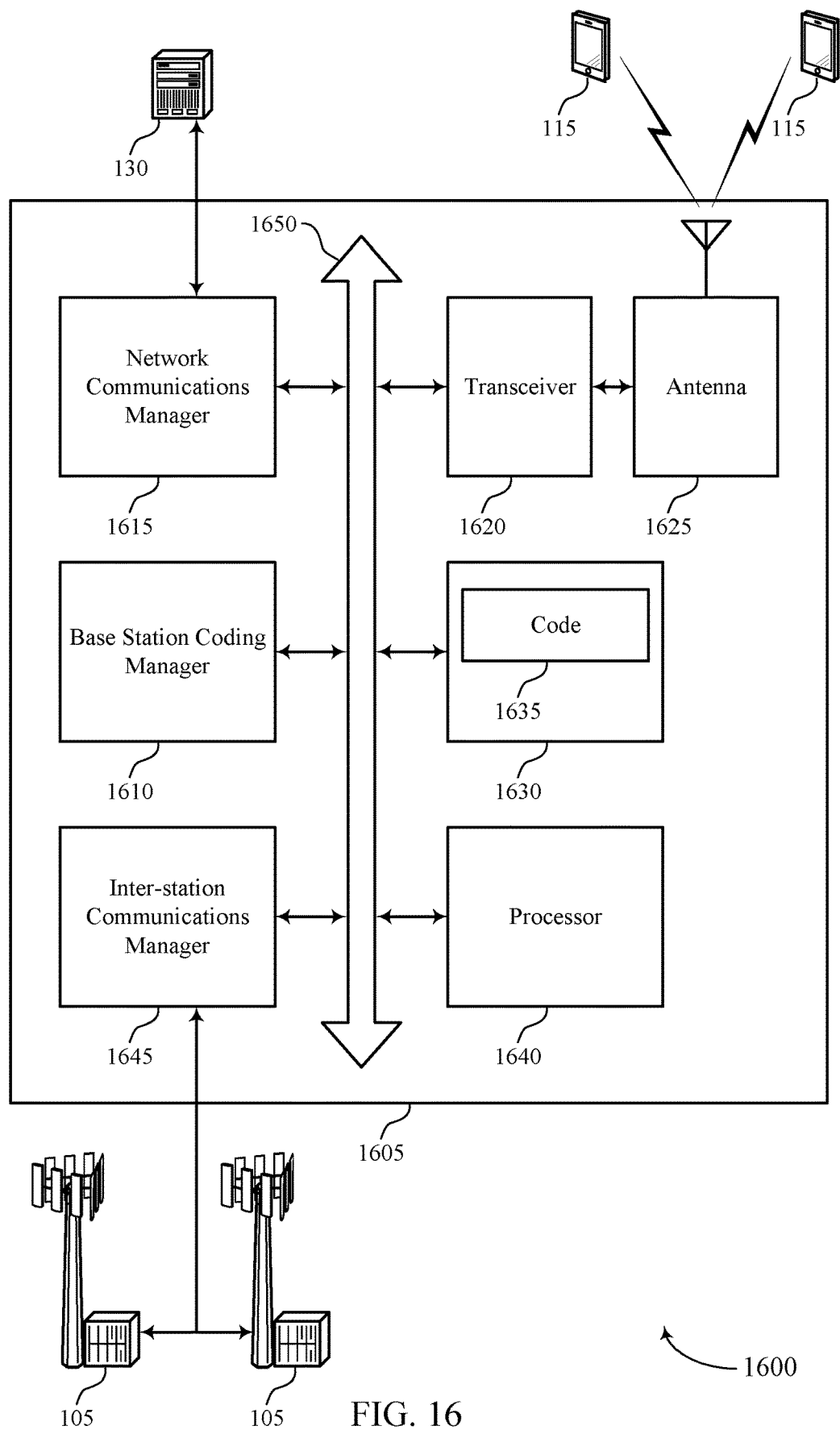
FIG. 16 shows a diagram of a system including a device that supports frequency hopping with slot bundling in accordance with aspects of the present disclosure.

FIG. 16 shows a diagram of a system 1600 including a device 1605 that supports frequency hopping with slot bundling in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station coding manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station coding manager 1610 may identify a frequency hopping pattern that provides for at least intra-bandwidth part frequency hopping for uplink communications from a UE, monitor, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots. The base station coding manager 1610 may also identify a frequency hopping pattern that provides for inter-bandwidth part frequency hopping for uplink communications from a UE, monitor, in accordance with the frequency hopping pattern, for one or more uplink transmissions from the UE during a first set of slots and within a first set of frequency resources, and monitor for retransmissions of the one or more uplink transmissions during a second set of slots and within a second set of frequency resources that are different from the first set of frequency resources in accordance with the frequency hopping pattern, where the first set of slots and the second set of slots each include two or more slots.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting frequency hopping with slot bundling).

The inter-station communications manager 1645 may manage communications with other base stations 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support frequency hopping with slot bundling. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
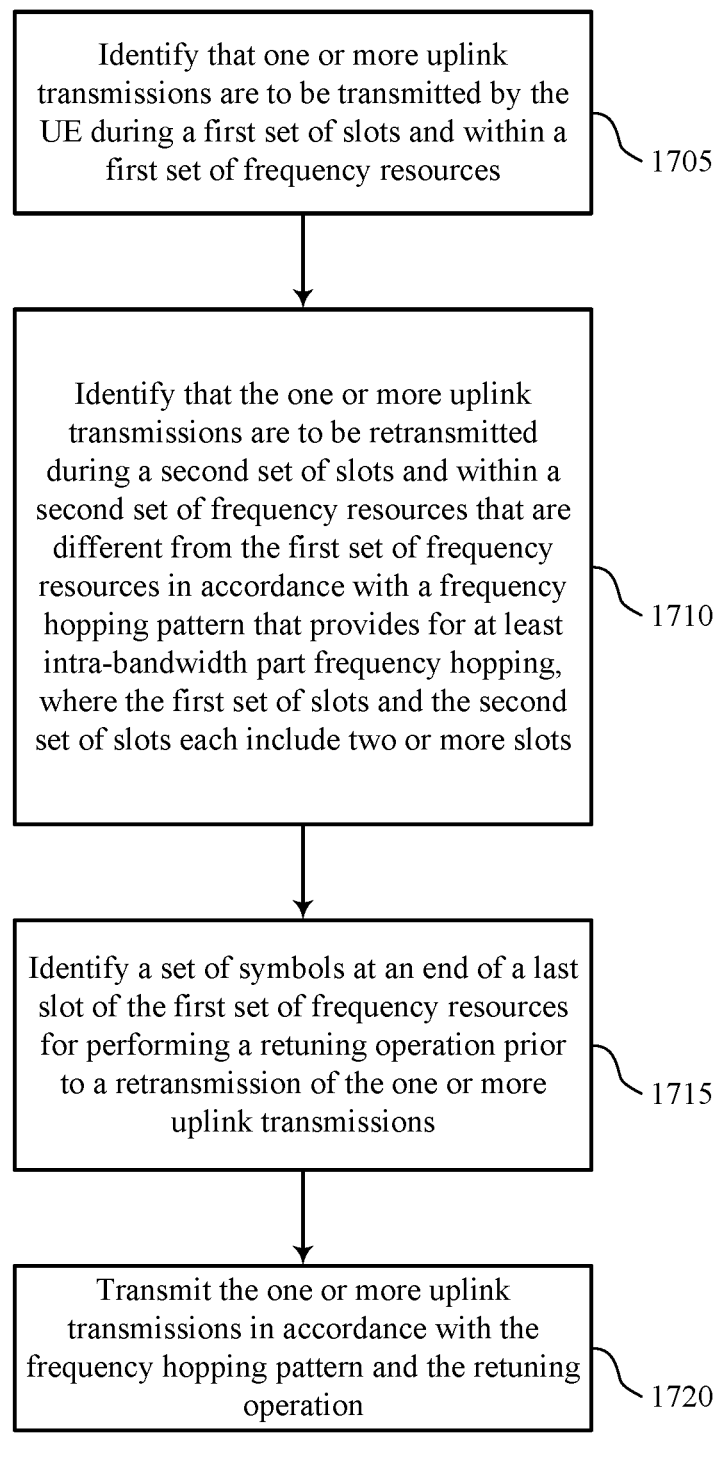
FIGS. 17 through 24 show flowcharts illustrating methods that support frequency hopping with slot bundling in accordance with aspects of the present disclosure.

FIG. 17 shows a flowchart illustrating a method 1700 that supports frequency hopping with slot bundling in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify that one or more uplink transmissions are to be transmitted by the UE during a first set of slots and within a first set of frequency resources. The operations of 1705 may be performed according to the methods described herein. In some examples, aspects of the operations of 1705 may be performed by a frequency hopping pattern manager as described with reference to FIGS. 9 through 12.

At 1710, the UE may identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots. The operations of 1710 may be performed according to the methods described herein. In some examples, aspects of the operations of 1710 may be performed by a frequency hopping pattern manager as described with reference to FIGS. 9 through 12.

At 1715, the UE may identify a set of symbols at an end of a last slot of the first set of frequency resources for performing a retuning operation prior to a retransmission of the one or more uplink transmissions. The operations of 1715 may be performed according to the methods described herein. In some examples, aspects of the operations of 1715 may be performed by a retuning operation manager as described with reference to FIGS. 9 through 12.

At 1720, the UE may transmit the one or more uplink transmissions in accordance with the frequency hopping pattern and the retuning operation. The operations of 1720 may be performed according to the methods described herein. In some examples, aspects of the operations of 1720 may be performed by an uplink transmission manager as described with reference to FIGS. 9 through 12.

Figure 18:
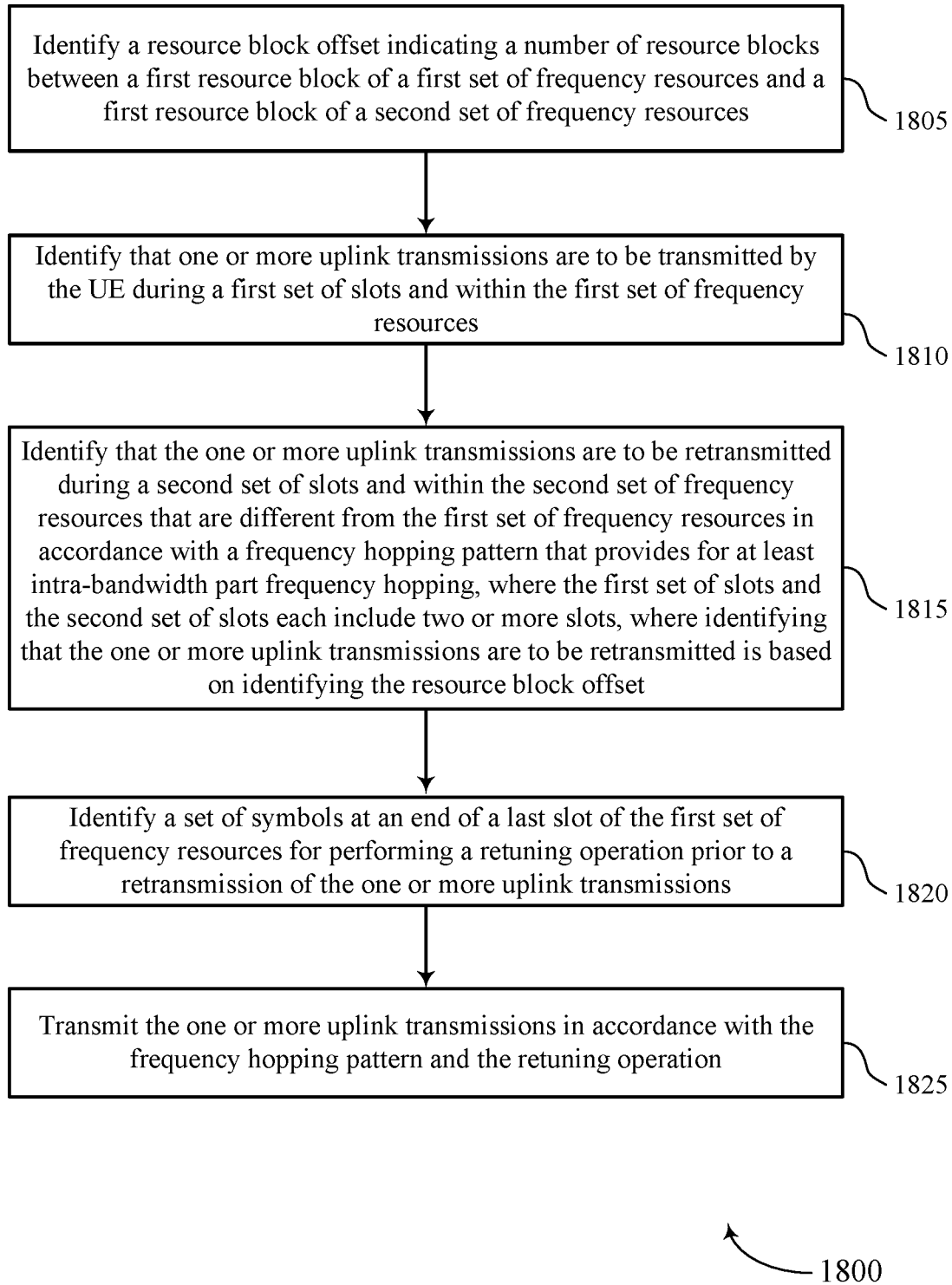

FIG. 18 shows a flowchart illustrating a method 1800 that supports frequency hopping with slot bundling in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may identify a resource block offset indicating a number of resource blocks between a first resource block of the first set of frequency resources and a first resource block of the second set of frequency resources. The operations of 1805 may be performed according to the methods described herein. In some examples, aspects of the operations of 1805 may be performed by a frequency hopping pattern manager as described with reference to FIGS. 9 through 12.

At 1810, the UE may identify that one or more uplink transmissions are to be transmitted by the UE during a first set of slots and within a first set of frequency resources. The operations of 1810 may be performed according to the methods described herein. In some examples, aspects of the operations of 1810 may be performed by a frequency hopping pattern manager as described with reference to FIGS. 9 through 12.

At 1815, the UE may identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots. In some instances, identifying that the one or more uplink transmissions are to be retransmitted is based on identifying the resource block offset. The operations of 1815 may be performed according to the methods described herein. In some examples, aspects of the operations of 1815 may be performed by a frequency hopping pattern manager as described with reference to FIGS. 9 through 12.

At 1820, the UE may identify a set of symbols at an end of a last slot of the first set of frequency resources for performing a retuning operation prior to a retransmission of the one or more uplink transmissions. The operations of 1820 may be performed according to the methods described herein. In some examples, aspects of the operations of 1820 may be performed by a retuning operation manager as described with reference to FIGS. 9 through 12.

At 1825, the UE may transmit the one or more uplink transmissions in accordance with the frequency hopping pattern and the retuning operation. The operations of 1825 may be performed according to the methods described herein. In some examples, aspects of the operations of 1825 may be performed by an uplink transmission manager as described with reference to FIGS. 9 through 12.

Figure 19:
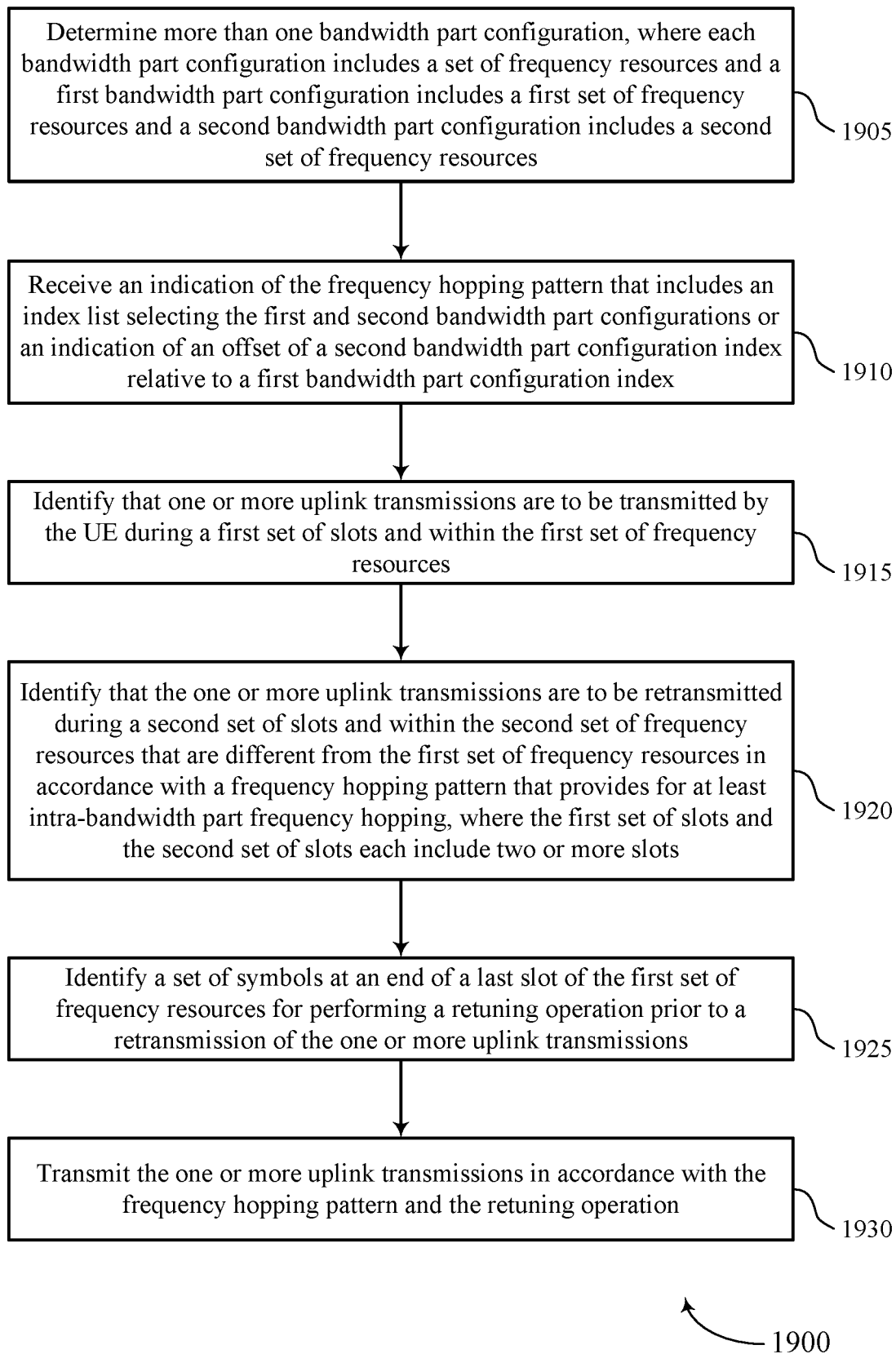

FIG. 19 shows a flowchart illustrating a method 1900 that supports frequency hopping with slot bundling in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may determine more than one bandwidth part configuration, where each bandwidth part configuration includes a set of frequency resources and a first bandwidth part configuration includes the first set of frequency resources and a second bandwidth part configuration includes the second set of frequency resources. The operations of 1905 may be performed according to the methods described herein. In some examples, aspects of the operations of 1905 may be performed by a frequency hopping pattern manager as described with reference to FIGS. 9 through 12.

At 1910, the UE may receive an indication of the frequency hopping pattern that includes an index list selecting the first and second bandwidth part configurations or an indication of an offset of a second bandwidth part configuration index relative to a first bandwidth part configuration index. The operations of 1910 may be performed according to the methods described herein. In some examples, aspects of the operations of 1910 may be performed by a frequency hopping pattern manager as described with reference to FIGS. 9 through 12.

At 1915, the UE may identify that one or more uplink transmissions are to be transmitted by the UE during a first set of slots and within a first set of frequency resources. The operations of 1915 may be performed according to the methods described herein. In some examples, aspects of the operations of 1915 may be performed by a frequency hopping pattern manager as described with reference to FIGS. 9 through 12.

At 1920, the UE may identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots. The operations of 1920 may be performed according to the methods described herein. In some examples, aspects of the operations of 1920 may be performed by a frequency hopping pattern manager as described with reference to FIGS. 9 through 12.

At 1925, the UE may identify a set of symbols at an end of a last slot of the first set of frequency resources for performing a retuning operation prior to a retransmission of the one or more uplink transmissions. The operations of 1925 may be performed according to the methods described herein. In some examples, aspects of the operations of 1925 may be performed by a retuning operation manager as described with reference to FIGS. 9 through 12.

At 1930, the UE may transmit the one or more uplink transmissions in accordance with the frequency hopping pattern and the retuning operation. The operations of 1930 may be performed according to the methods described herein. In some examples, aspects of the operations of 1930 may be performed by an uplink transmission manager as described with reference to FIGS. 9 through 12.

Figure 20:
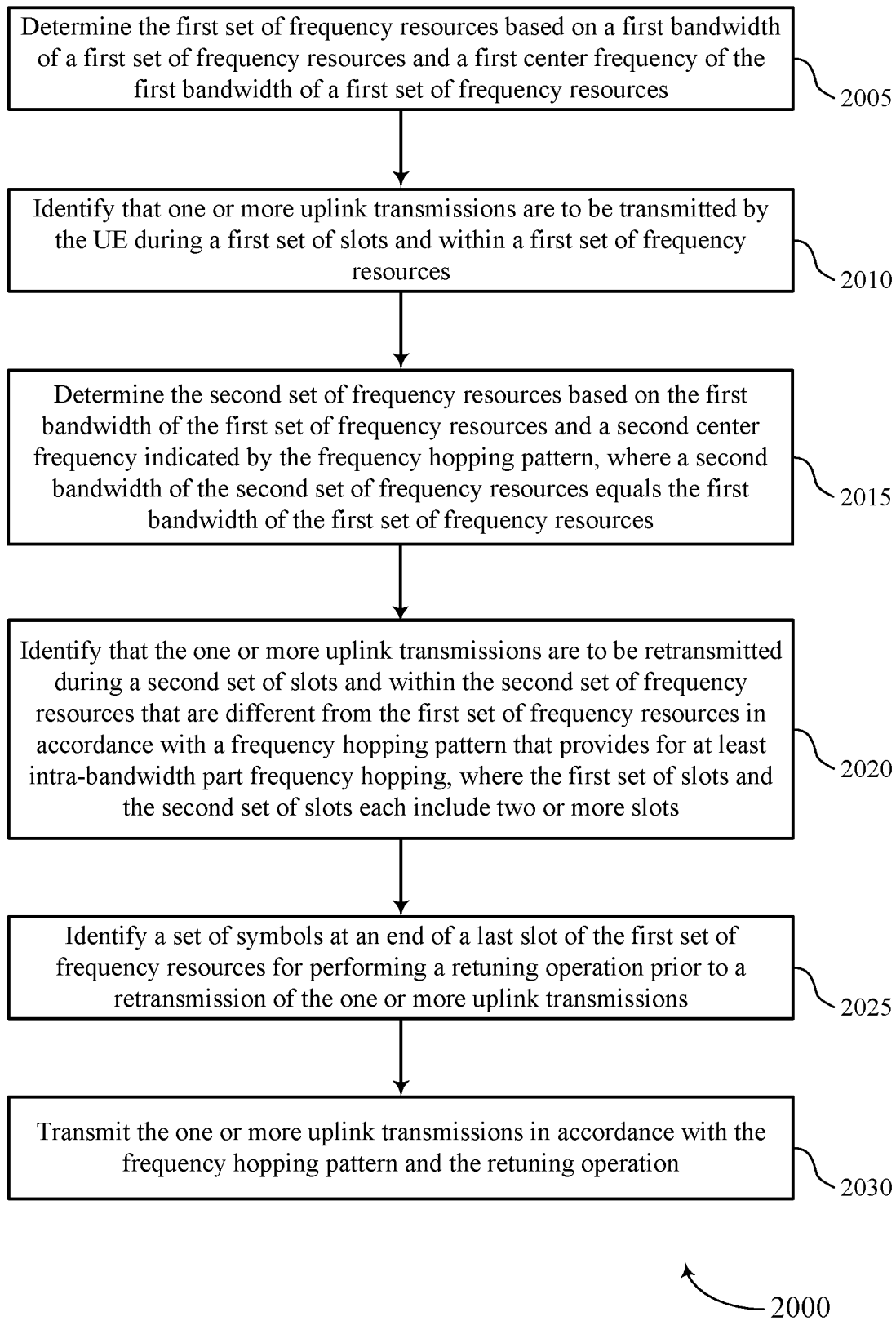

FIG. 20 shows a flowchart illustrating a method 2000 that supports frequency hopping with slot bundling in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may determine a first set of frequency resources based on a first bandwidth of the first set of frequency resources and a first center frequency of the first bandwidth of the first set of frequency resources. The operations of 2005 may be performed according to the methods described herein. In some examples, aspects of the operations of 2005 may be performed by a frequency hopping pattern manager as described with reference to FIGS. 9 through 12.

At 2010, the UE may identify that one or more uplink transmissions are to be transmitted by the UE during a first set of slots and within the first set of frequency resources. The operations of 2010 may be performed according to the methods described herein. In some examples, aspects of the operations of 2010 may be performed by a frequency hopping pattern manager as described with reference to FIGS. 9 through 12.

At 2015, the UE may determine a second set of frequency resources based on the first bandwidth of the first set of frequency resources and a second center frequency indicated by the frequency hopping pattern, where a second bandwidth of the second set of frequency resources equals the first bandwidth of the first set of frequency resources. The operations of 2015 may be performed according to the methods described herein. In some examples, aspects of the operations of 2015 may be performed by a frequency hopping pattern manager as described with reference to FIGS. 9 through 12.

At 2020, the UE may identify that the one or more uplink transmissions are to be retransmitted during a second set of slots and within the second set of frequency resources that are different from the first set of frequency resources in accordance with a frequency hopping pattern that provides for at least intra-bandwidth part frequency hopping, where the first set of slots and the second set of slots each include two or more slots. The operations of 2020 may be performed according to the methods described herein. In some examples, aspects of the operations of 2020 may be performed by a frequency hopping pattern manager as described with reference to FIGS. 9 through 12.

At 2025, the UE may identify a set of symbols at an end of a last slot of the first set of frequency resources for performing a retuning operation prior to a retransmission of the one or more uplink transmissions. The operations of 2025 may be performed according to the methods described herein. In some examples, aspects of the operations of 2025 may be performed by a retuning operation manager as described with reference to FIGS. 9 through 12.

At 2030, the UE may transmit the one or more uplink transmissions in accordance with the frequency hopping pattern and the retuning operation. The operations of 2030 may be performed according to the methods described herein. In some examples, aspects of the operations of 2030 may be performed by an uplink transmission manager as described with reference to FIGS. 9 through 12.

Figure 21:
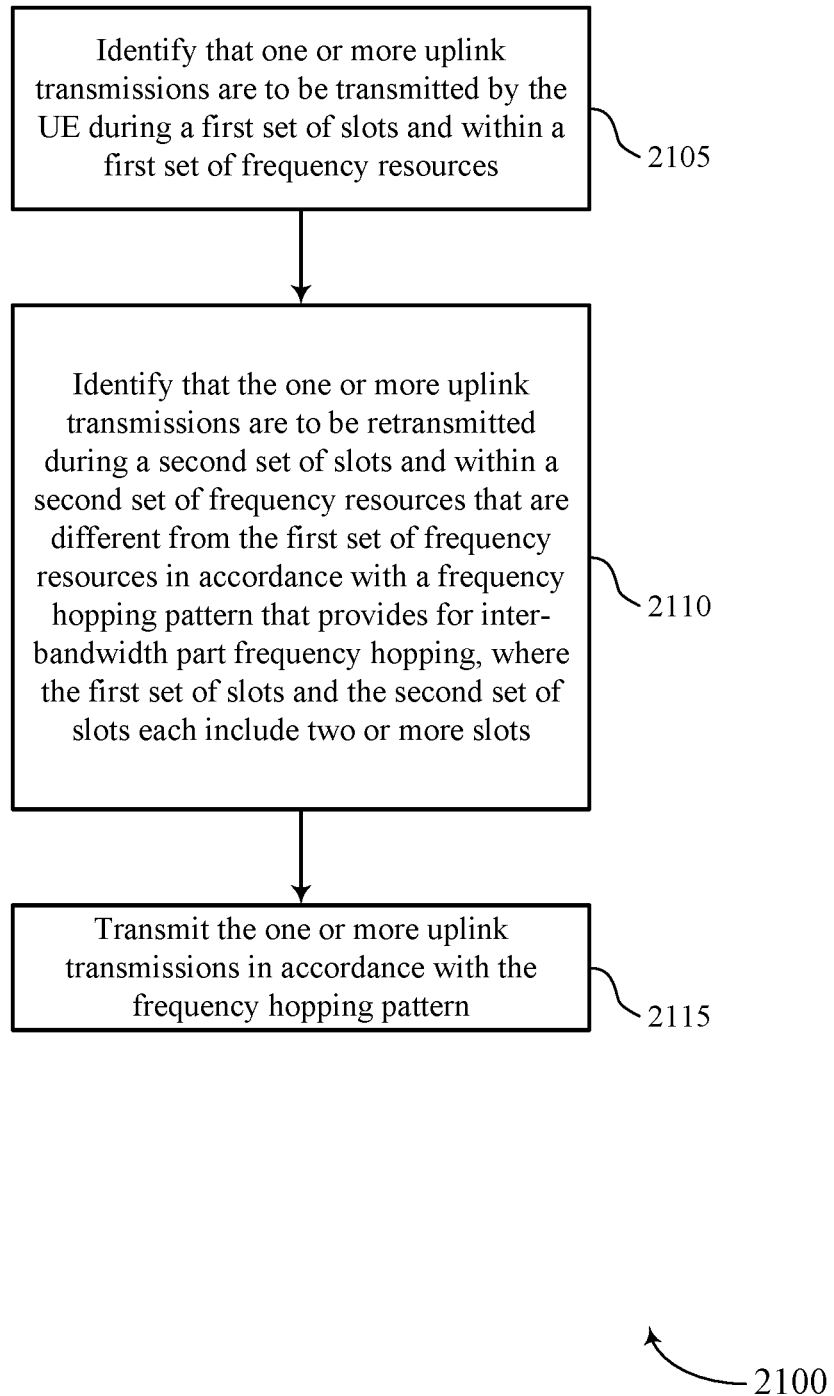

FIG. 21 shows a flowchart illustrating a method 2100 that supports frequency hopping with slot bundling in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may identify that one or more uplink transmissions are to be transmitted by the UE during a first set of slots and within a first set of frequency resources. The operations of 2105 may be performed according to the methods described herein. In some examples, aspects of the operations of 2105 may be performed by a frequency hopping pattern manager as described with reference to FIGS. 9 through 12.

At 2110, the UE may identify that the one or more uplink transmissions are to be retransmitted during a second set of slots and within a second set of frequency resources that are different from the first set of frequency resources in accordance with a frequency hopping pattern that provides for inter-bandwidth part frequency hopping, where the first set of slots and the second set of slots each include two or more slots. The operations of 2110 may be performed according to the methods described herein. In some examples, aspects of the operations of 2110 may be performed by a frequency hopping pattern manager as described with reference to FIGS. 9 through 12.

At 2115, the UE may transmit the one or more uplink transmissions in accordance with the frequency hopping pattern. The operations of 2115 may be performed according to the methods described herein. In some examples, aspects of the operations of 2115 may be performed by an uplink transmission manager as described with reference to FIGS. 9 through 12.

Figure 22:
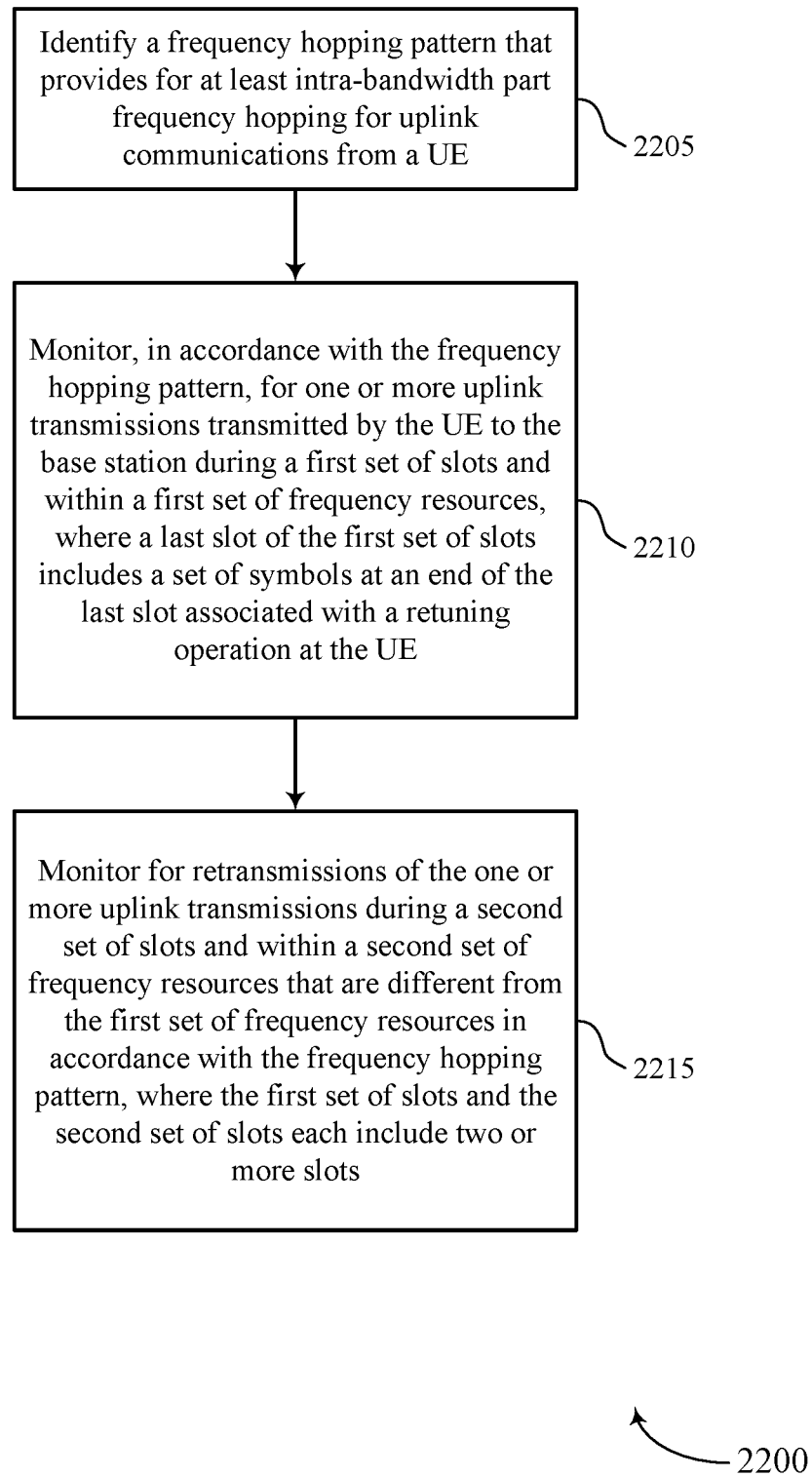

FIG. 22 shows a flowchart illustrating a method 2200 that supports frequency hopping with slot bundling in accordance with aspects of the present disclosure. The operations of method 2200 may be implemented by a base station 105 or its components as described herein. For example, the operations of method 2200 may be performed by a base station coding manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may identify a frequency hopping pattern that provides for at least intra-bandwidth part frequency hopping for uplink communications from a UE. The operations of 2205 may be performed according to the methods described herein. In some examples, aspects of the operations of 2205 may be performed by a frequency hopping pattern identifier as described with reference to FIGS. 13 through 16.

At 2210, the base station may monitor, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE. The operations of 2210 may be performed according to the methods described herein. In some examples, aspects of the operations of 2210 may be performed by a transmission monitoring manager as described with reference to FIGS. 13 through 16.

At 2215, the base station may monitor for retransmissions of the one or more uplink transmissions during a second set of slots and within a second set of frequency resources that are different from the first set of frequency resources in accordance with the frequency hopping pattern, where the first set of slots and the second set of slots each include two or more slots. The operations of 2215 may be performed according to the methods described herein. In some examples, aspects of the operations of 2215 may be performed by a retransmission monitoring manager as described with reference to FIGS. 13 through 16.

Figure 23:
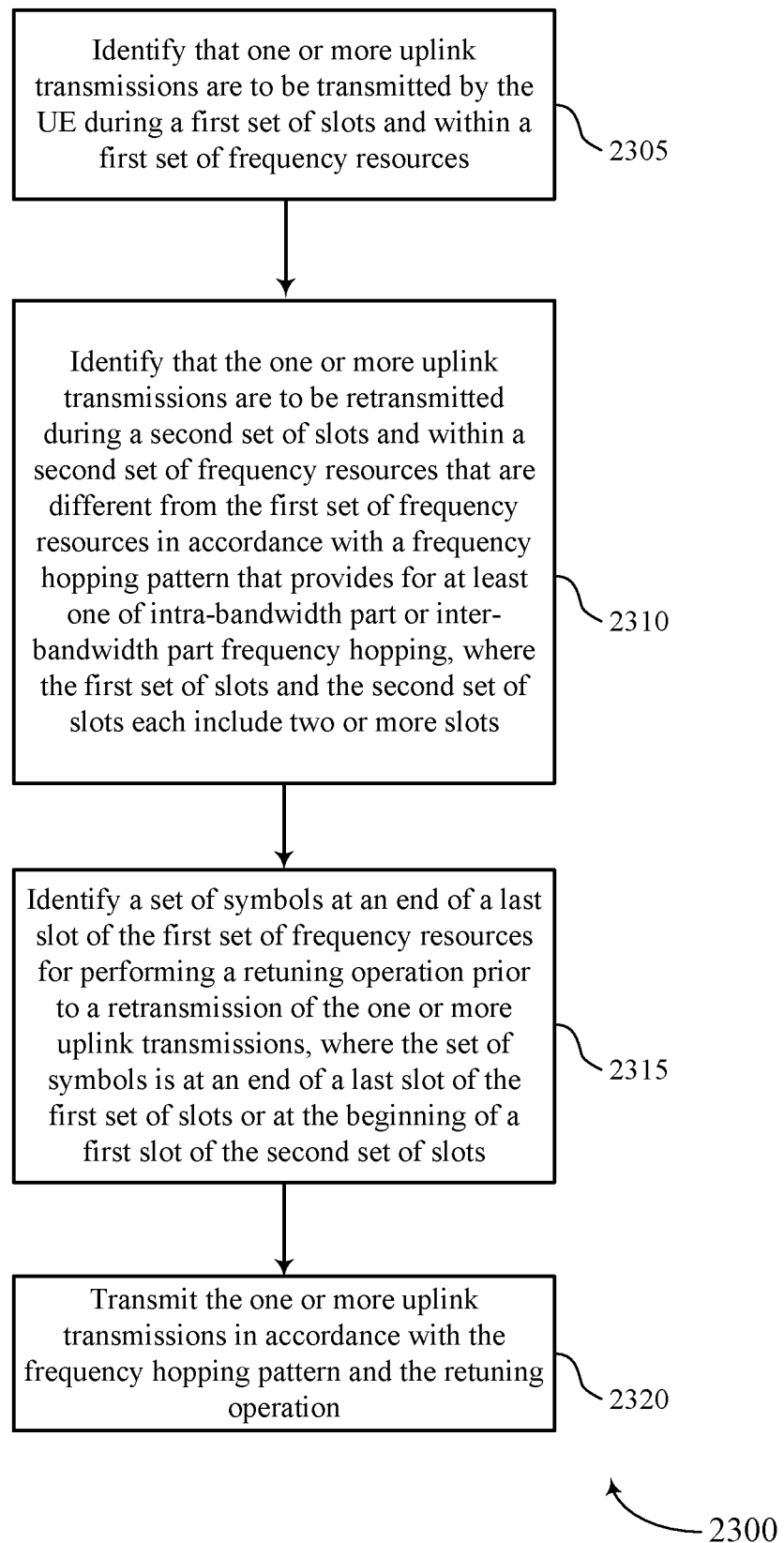

FIG. 23 shows a flowchart illustrating a method 2300 that supports frequency hopping with slot bundling in accordance with aspects of the present disclosure. The operations of method 2300 may be implemented by a UE 115 or its components as described herein. For example, the operations of method 2300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2305, the UE may identify that one or more uplink transmissions are to be transmitted by the UE during a first set of slots and within a first set of frequency resources. The operations of 2305 may be performed according to the methods described herein. In some examples, aspects of the operations of 2305 may be performed by a frequency hopping pattern manager as described with reference to FIGS. 9 through 12.

At 2310, the UE may identify that the one or more uplink transmissions are to be retransmitted during a second set of slots and within a second set of frequency resources that are different from the first set of frequency resources in accordance with a frequency hopping pattern that provides for at least intra-bandwidth part frequency hopping, where the first set of slots and the second set of slots each include two or more slots. The operations of 2310 may be performed according to the methods described herein. In some examples, aspects of the operations of 2310 may be performed by a frequency hopping pattern manager as described with reference to FIGS. 9 through 12.

At 2315, the UE may identify a set of symbols at an end of a last slot of the first set of frequency resources for performing a retuning operation prior to a retransmission of the one or more uplink transmissions. The operations of 2315 may be performed according to the methods described herein. In some examples, aspects of the operations of 2315 may be performed by a retuning operation manager as described with reference to FIGS. 9 through 12.

At 2320, the UE may transmit the one or more uplink transmissions in accordance with the frequency hopping pattern and the retuning operation. The operations of 2320 may be performed according to the methods described herein. In some examples, aspects of the operations of 2320 may be performed by an uplink transmission manager as described with reference to FIGS. 9 through 12.

Figure 24:
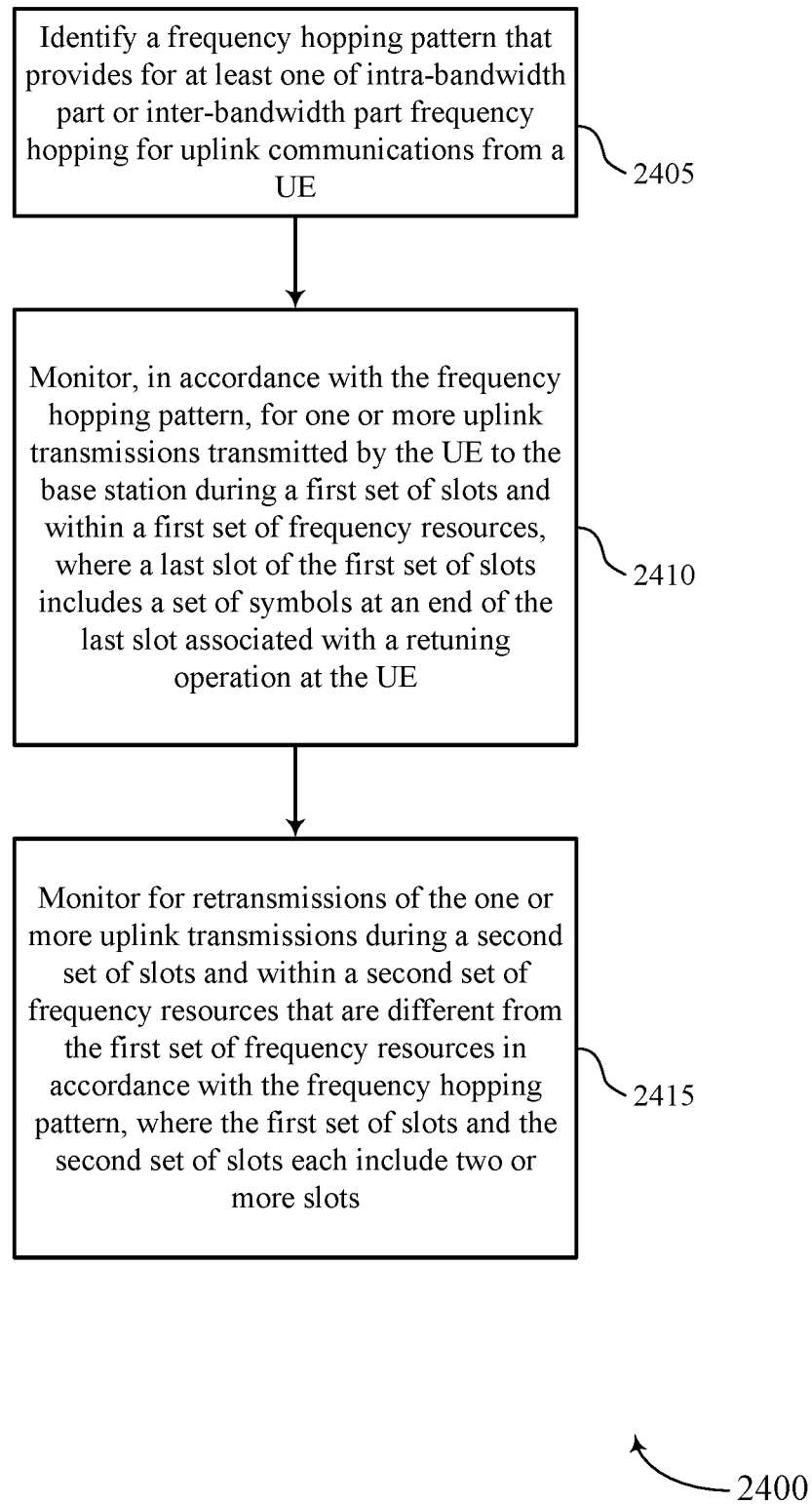

FIG. 24 shows a flowchart illustrating a method 2400 that supports frequency hopping with slot bundling in accordance with aspects of the present disclosure. The operations of method 2400 may be implemented by a base station 105 or its components as described herein. For example, the operations of method 2400 may be performed by a base station coding manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may identify a frequency hopping pattern that provides for at least intra-bandwidth part frequency hopping for uplink communications from a UE. The operations of 2405 may be performed according to the methods described herein. In some examples, aspects of the operations of 2405 may be performed by a frequency hopping pattern identifier as described with reference to FIGS. 13 through 16.

At 2410, the base station may monitor, in accordance with the frequency hopping pattern, for one or more uplink transmissions transmitted by the UE to the base station during a first set of slots and within a first set of frequency resources, where a last slot of the first set of slots includes a set of symbols at an end of the last slot associated with a retuning operation at the UE. The operations of 2410 may be performed according to the methods described herein. In some examples, aspects of the operations of 2410 may be performed by a transmission monitoring manager as described with reference to FIGS. 13 through 16.

At 2415, the base station may monitor for retransmissions of the one or more uplink transmissions during a second set of slots and within a second set of frequency resources that are different from the first set of frequency resources in accordance with the frequency hopping pattern, where the first set of slots and the second set of slots each include two or more slots. The operations of 2415 may be performed according to the methods described herein. In some examples, aspects of the operations of 2415 may be performed by a retransmission monitoring manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
identifying that one or more uplink transmissions are to be transmitted by the UE during a first set of slots and within a first set of frequency resources;
identifying that the one or more uplink transmissions are to be retransmitted during a second set of slots and within a second set of frequency resources that are different from the first set of frequency resources in accordance with a frequency hopping pattern that provides for at least one of intra-bandwidth part or inter-bandwidth part frequency hopping, wherein the first set of slots and the second set of slots each include two or more slots;
identifying a set of symbols at an end of a last slot of the first set of frequency resources for performing a retuning operation prior to a retransmission of the one or more uplink transmissions, wherein the set of symbols is at an end of a last slot of the first set of slots or at the beginning of a first slot of the second set of slots; and
transmitting the one or more uplink transmissions in accordance with the frequency hopping pattern and the retuning operation.

2. The method of claim 1, further comprising:
identifying a resource block offset indicating a number of resource blocks between a first resource block of the first set of frequency resources and a first resource block of the second set of frequency resources, wherein identifying that the one or more uplink transmissions are to be retransmitted is based at least in part on identifying the resource block offset.

3. The method of claim 2, further comprising:
determining, based at least in part on the resource block offset, whether a range of the second set of frequency resources exceeds a maximum bandwidth of the UE or is within a maximum bandwidth of the UE.

4. The method of claim 3, further comprising:
dropping the retransmission during the second set of slots based at least in part on determining that the range of the second set of frequency resources exceeds the maximum bandwidth of the UE.

5. The method of claim 3, further comprising:
transmitting the retransmission during the second set of slots using a portion of resource blocks of the second set of frequency resources within the maximum bandwidth of the UE, wherein transmitting the retransmission is based at least in part on determining that the range of the second set of frequency resources exceed the maximum bandwidth of the UE.

6. The method of claim 1, further comprising:
determining more than one bandwidth part configuration, wherein each bandwidth part configuration comprises a set of frequency resources and a first bandwidth part configuration comprises the first set of frequency resources and a second bandwidth part configuration comprises the second set of frequency resources; and
receiving an indication of the frequency hopping pattern that includes an index list selecting the first and second bandwidth part configurations or an indication of an offset of a second bandwidth part configuration index relative to a first bandwidth part configuration index.

7. The method of claim 1, further comprising:
determining the first set of frequency resources based at least in part on a first bandwidth of the first set of frequency resources and a first center frequency of the first bandwidth of the first set of frequency resources; and
determining the second set of frequency resources based at least in part on the first bandwidth of the first set of frequency resources and a second center frequency indicated by the frequency hopping pattern, wherein a second bandwidth of the second set of frequency resources equals the first bandwidth of the first set of frequency resources.

8. The method of claim 1, wherein a first number of slots within the first set of slots and a second number of slots within the second set of slots is based at least in part on a mobility of the UE, a retuning requirement, a configuration of the one or more uplink transmissions, a reference signal received power, a signal to interference-plus-noise ratio, or a combination thereof.

9. The method of claim 1, wherein a first bandwidth part associated with the first set of frequency resources spans a same number of resource blocks as a second bandwidth part associated with the second set of frequency resources.

10. The method of claim 9, further comprising:
determining a position within the first bandwidth part of a starting resource block of the first set of frequency resources; and
determining that a position within the second bandwidth part of a starting resource block of the second set of frequency resources is the same as the position within the first bandwidth part based at least in part on the first bandwidth part spanning the same number of resource blocks as the second bandwidth part.

11. The method of claim 1, wherein:
a first bandwidth part associated with the first set of frequency resources spans fewer resource blocks than a second bandwidth part associated with the second set of frequency resources;
the first set of frequency resources spans fewer resource blocks than the second set of frequency resources; and
the first set of slots comprises more slots than the second set of slots.

12. The method of claim 1, wherein a first bandwidth part associated with the first set of frequency resources spans more resource blocks than a second bandwidth part associated with the second set of frequency resources.

13. The method of claim 12, wherein:
the first set of frequency resources spans more resource blocks than the second set of frequency resources; and
the first set of slots comprises fewer slots than the second set of slots.

14. The method of claim 12, further comprising:
dropping a portion of the one or more uplink transmissions from the second set of frequency resources, wherein the portion of the one or more uplink transmissions is mapped to resource blocks outside of the second bandwidth part or outside of the second set of frequency resources.

15. The method of claim 1, wherein transmitting the one or more uplink transmissions further comprises:
transmitting the one or more uplink transmissions during the first set of slots and within the first set of frequency resources;
performing the retuning operation during the set of symbols; and
transmitting the one or more uplink transmissions during the second set of slots and within the second set of frequency resources after performing the retuning operation.

16. The method of claim 15, further comprising:
determining that a portion of the first slot of the second set of slots is reserved for control signaling, wherein the set of symbols is within the portion of the first slot of the second set of slots based at least in part on the determining.

17. The method of claim 1, further comprising:
transmitting, to a base station, an indication of a number of symbols within the set of symbols, wherein the number of symbols is based at least in part on a capability of the UE.

18. The method of claim 1, further comprising:
determining that a portion of a first slot of the second set of slots is configured to transmit a demodulation reference signal, wherein the set of symbols is within the last slot of the first set of slots or at the end of the last slot of the first set of slots based at least in part on the determining.

19. The method of claim 1, further comprising:
determining that an uplink transmission within the last slot comprises uplink control information; and
increasing a first transmission power of the last slot relative to a second transmission power of a remaining portion of the first set of slots based at least in part on determining that the uplink transmission comprises uplink control information.

20. The method of claim 1, wherein the one or more uplink transmissions are physical random access channel (PRACH) transmissions.

21. The method of claim 20, further comprising:
determining that a coverage associated with the UE is below a threshold, wherein identifying that the one or more uplink transmissions are to be retransmitted is based at least in part on determining that the coverage associated with the UE is below the threshold.

22. The method of claim 20, wherein the first set of slots within the first set of frequency resources comprises a default PRACH transmission occasion.

23. The method of claim 22, wherein the default PRACH transmission occasion is configured to be used by a first UE type with a reduced capability or complexity and a second UE type with a standard capability or complexity.

24. The method of claim 20, wherein the first set of slots within the first set of frequency resources and the second set of slots within the second set of frequency resources are different transmission occasions than a default PRACH transmission occasion.

25. The method of claim 24, wherein a first UE type includes a limited capability or complexity and is configured to refrain from transmitting during the default PRACH transmission occasion used for a second UE type that includes a standard capability or complexity.

26. The method of claim 1, wherein the first set of frequency resources spans a same number of resource blocks as the second set of frequency resources.

27. A method for wireless communications at a base station, comprising:
identifying a frequency hopping pattern that provides for at least one of intra-bandwidth part or inter-bandwidth part frequency hopping for uplink communications from a user equipment (UE);
monitoring, in accordance with the frequency hopping pattern, for one or more uplink transmissions transmitted by the UE to the base station during a first set of slots and within a first set of frequency resources, wherein a last slot of the first set of slots comprises a set of symbols at an end of the last slot associated with a retuning operation at the UE; and
monitoring for retransmissions of the one or more uplink transmissions during a second set of slots and within a second set of frequency resources that are different from the first set of frequency resources in accordance with the frequency hopping pattern, wherein the first set of slots and the second set of slots each include two or more slots.

28. The method of claim 27, wherein identifying the frequency hopping pattern further comprises:
identifying a resource block offset indicating a number of resource blocks between a first resource block of the first set of frequency resources and a first resource block of the second set of frequency resources, wherein identifying that the one or more uplink transmissions are to be retransmitted is based at least in part on identifying the resource block offset.

29. An apparatus for wireless communications at a user equipment (UE), comprising:
a processor,
memory coupled with the processor; and
instructions stored in the memory and executable by the processor to cause the apparatus to:
identify that one or more uplink transmissions are to be transmitted by the UE during a first set of slots and within a first set of frequency resources;
identify that the one or more uplink transmissions are to be retransmitted during a second set of slots and within a second set of frequency resources that are different from the first set of frequency resources in accordance with a frequency hopping pattern that provides for at least one of intra-bandwidth part or inter-bandwidth part frequency hopping, wherein the first set of slots and the second set of slots each include two or more slots;
identify a set of symbols at an end of a last slot of the first set of frequency resources for performing a retuning operation prior to a retransmission of the one or more uplink transmissions, wherein the set of symbols is at an end of a last slot of the first set of slots or at the beginning of a first slot of the second set of slots; and
transmit the one or more uplink transmissions in accordance with the frequency hopping pattern and the retuning operation.

30. An apparatus for wireless communications at a base station, comprising:
a processor,
memory coupled with the processor; and
instructions stored in the memory and executable by the processor to cause the apparatus to:
identify a frequency hopping pattern that provides for at least one of intra-bandwidth part or inter-bandwidth part frequency hopping for uplink communications from a user equipment (UE);
monitor, in accordance with the frequency hopping pattern, for one or more uplink transmissions transmitted by the UE to the base station during a first set of slots and within a first set of frequency resources, wherein a last slot of the first set of slots comprises a set of symbols at an end of the last slot associated with a retuning operation at the UE; and
monitor for retransmissions of the one or more uplink transmissions during a second set of slots and within a second set of frequency resources that are different from the first set of frequency resources in accordance with the frequency hopping pattern, wherein the first set of slots and the second set of slots each include two or more slots.

* * * * *